United States Patent
Davydov et al.

(10) Patent No.: US 10,098,032 B2
(45) Date of Patent: *Oct. 9, 2018

(54) METHOD OF ENHANCED INTERFERENCE MEASUREMENTS FOR CHANNEL STATE INFORMATION (CSI) FEEDBACK

(71) Applicant: Intel Corporation, Santa Clara, CA (US)

(72) Inventors: Alexei Davydov, Nizhny Novgorod (RU); Gregory Morozov, Nizhny Novgorod (RU); Seunghee Han, San Jose, CA (US); Debdeep Chatterjee, Mountain View, CA (US); Ilya Bolotin, Nizhny-Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,778

(22) Filed: Aug. 17, 2017

(65) Prior Publication Data

US 2017/0347286 A1    Nov. 30, 2017

Related U.S. Application Data

(63) Continuation of application No. 14/027,401, filed on Sep. 16, 2013, now Pat. No. 9,781,638.

(Continued)

(51) Int. Cl.
*H04L 5/00* (2006.01)
*H04W 28/02* (2009.01)
(Continued)

(52) U.S. Cl.
CPC .......... *H04W 28/0221* (2013.01); *H04B 5/00* (2013.01); *H04B 17/318* (2015.01);
(Continued)

(58) Field of Classification Search
CPC ............... H04L 5/0048; H04L 5/0053; H04W 72/0446; H04W 24/10; H04W 72/085
See application file for complete search history.

(56) References Cited

U.S. PATENT DOCUMENTS

| | | | |
|---|---|---|---|
| 8,989,114 B2 | 3/2015 | Kim et al. | |
| 9,008,585 B2 * | 4/2015 | Xiao | H04W 72/082 455/63.1 |

(Continued)

FOREIGN PATENT DOCUMENTS

| | | |
|---|---|---|
| CN | 102300244 A | 12/2011 |
| CN | 104737485 A | 6/2015 |

(Continued)

OTHER PUBLICATIONS

"U.S. Appl. No. 14/027,401, Examiner Interview Summary dated Dec. 14, 2016", 3 pgs.

(Continued)

*Primary Examiner* — Charles C Jiang
*Assistant Examiner* — Will W Lin
(74) *Attorney, Agent, or Firm* — Schwegman Lundberg & Woessner, P.A.

(57) ABSTRACT

Embodiments of providing enhanced interference measurements for CSI feedback are generally described herein. In some embodiments, CSI-IM resources are used by UE to perform interference measurements. The serving cell determines a hopping pattern for varying a position of the determined CSI-IM resources in subframes transmitted to the served UE. The determined CSI-IM resources and the determined CSI-IM resources hopping pattern are transmitted to the served UE. The serving node transmits a zero-power (ZP) CSI-RS. The serving node receives an interference measurement from the served UE based on CSI-IM and ZP CSI-RS provided to the served UE from the serving cell. Collisions between the CSI-IM of the serving node and CSI-IM of the non-serving nodes are minimized by the determined CSI-IM resources hopping pattern.

24 Claims, 12 Drawing Sheets

Related U.S. Application Data

(60) Provisional application No. 61/707,784, filed on Sep. 28, 2012.

(51) Int. Cl.

| | | |
|---|---|---|
| H04W 4/70 | (2018.01) | |
| H04W 76/30 | (2018.01) | |
| H04W 76/28 | (2018.01) | |
| H04W 48/14 | (2009.01) | |
| H04W 72/04 | (2009.01) | |
| H04W 76/04 | (2009.01) | |
| H04L 29/06 | (2006.01) | |
| H04W 52/02 | (2009.01) | |
| H04W 40/00 | (2009.01) | |
| H04B 5/00 | (2006.01) | |
| H04W 40/24 | (2009.01) | |
| H04W 52/04 | (2009.01) | |
| H04B 17/318 | (2015.01) | |
| H04W 76/12 | (2018.01) | |
| H04W 76/15 | (2018.01) | |
| H04W 76/23 | (2018.01) | |
| H04W 76/27 | (2018.01) | |
| H04J 3/16 | (2006.01) | |
| H04J 11/00 | (2006.01) | |
| H04L 1/18 | (2006.01) | |
| H04L 5/14 | (2006.01) | |
| H04L 12/24 | (2006.01) | |
| H04L 29/08 | (2006.01) | |
| H04W 8/08 | (2009.01) | |
| H04W 24/02 | (2009.01) | |
| H04W 24/08 | (2009.01) | |
| H04W 24/10 | (2009.01) | |
| H04W 28/08 | (2009.01) | |
| H04W 28/16 | (2009.01) | |
| H04W 36/00 | (2009.01) | |
| H04W 36/22 | (2009.01) | |
| H04W 48/16 | (2009.01) | |
| H04W 48/20 | (2009.01) | |
| H04W 52/14 | (2009.01) | |
| H04W 72/02 | (2009.01) | |
| H04W 72/08 | (2009.01) | |
| H04W 72/12 | (2009.01) | |
| H04W 74/00 | (2009.01) | |
| H04W 88/02 | (2009.01) | |
| H04W 76/16 | (2018.01) | |
| H04L 12/26 | (2006.01) | |
| H04W 36/14 | (2009.01) | |
| H04B 17/00 | (2015.01) | |
| H04W 36/08 | (2009.01) | |
| H04W 48/18 | (2009.01) | |
| H04W 72/00 | (2009.01) | |
| H04W 80/10 | (2009.01) | |
| H04W 84/12 | (2009.01) | |
| H04W 88/08 | (2009.01) | |
| H04W 88/18 | (2009.01) | |
| H04W 84/04 | (2009.01) | |
| H04W 88/12 | (2009.01) | |
| H04W 88/14 | (2009.01) | |
| H04W 88/16 | (2009.01) | |

(52) U.S. Cl.
CPC .......... *H04J 3/1694* (2013.01); *H04J 11/00* (2013.01); *H04J 11/0086* (2013.01); *H04L 1/1812* (2013.01); *H04L 1/1864* (2013.01); *H04L 1/1893* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/069* (2013.01); *H04L 41/5032* (2013.01); *H04L 43/16* (2013.01); *H04L 65/4084* (2013.01); *H04L 65/60* (2013.01); *H04L 65/602* (2013.01); *H04L 65/608* (2013.01); *H04L 67/10* (2013.01); *H04W 4/70* (2018.02); *H04W 8/08* (2013.01); *H04W 24/02* (2013.01); *H04W 24/08* (2013.01); *H04W 24/10* (2013.01); *H04W 28/0205* (2013.01); *H04W 28/0215* (2013.01); *H04W 28/0252* (2013.01); *H04W 28/0268* (2013.01); *H04W 28/08* (2013.01); *H04W 28/16* (2013.01); *H04W 36/0061* (2013.01); *H04W 36/0066* (2013.01); *H04W 36/0083* (2013.01); *H04W 36/0088* (2013.01); *H04W 36/14* (2013.01); *H04W 36/22* (2013.01); *H04W 40/005* (2013.01); *H04W 40/246* (2013.01); *H04W 48/14* (2013.01); *H04W 48/16* (2013.01); *H04W 48/20* (2013.01); *H04W 52/0209* (2013.01); *H04W 52/0212* (2013.01); *H04W 52/0225* (2013.01); *H04W 52/0235* (2013.01); *H04W 52/0258* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/0453* (2013.01); *H04W 72/0486* (2013.01); *H04W 72/082* (2013.01); *H04W 72/1284* (2013.01); *H04W 74/002* (2013.01); *H04W 74/004* (2013.01); *H04W 76/048* (2013.01); *H04W 76/12* (2018.02); *H04W 76/15* (2018.02); *H04W 76/16* (2018.02); *H04W 76/23* (2018.02); *H04W 76/27* (2018.02); *H04W 76/28* (2018.02); *H04W 76/30* (2018.02); *H04W 88/02* (2013.01); *H04L 5/001* (2013.01); *H04W 36/08* (2013.01); *H04W 48/18* (2013.01); *H04W 52/0261* (2013.01); *H04W 72/005* (2013.01); *H04W 80/10* (2013.01); *H04W 84/042* (2013.01); *H04W 84/12* (2013.01); *H04W 88/08* (2013.01); *H04W 88/12* (2013.01); *H04W 88/14* (2013.01); *H04W 88/16* (2013.01); *H04W 88/18* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/23* (2018.01); *Y02D 70/24* (2018.01); *Y02D 70/25* (2018.01); *Y02D 70/42* (2018.01)

(56) References Cited

U.S. PATENT DOCUMENTS

| | | | |
|---|---|---|---|
| 9,374,806 | B2 | 6/2016 | Han et al. |
| 9,596,067 | B2 * | 3/2017 | Kim ............... H04L 5/0005 |
| 9,603,132 | B2 | 3/2017 | Han et al. |
| 9,723,506 | B2 * | 8/2017 | Kim ............... H04W 24/10 |
| 9,781,638 | B2 | 10/2017 | Davydov et al. |
| 2012/0020230 | A1 | 1/2012 | Chen et al. |
| 2012/0213261 | A1 | 8/2012 | Sayana et al. |
| 2012/0220327 | A1 | 8/2012 | Lee et al. |

(56) References Cited

U.S. PATENT DOCUMENTS

| | | | |
|---|---|---|---|
| 2013/0196675 A1 | 8/2013 | Xiao et al. | |
| 2013/0208604 A1* | 8/2013 | Lee | H04L 25/0226 370/252 |
| 2013/0322352 A1 | 12/2013 | Han et al. | |
| 2014/0003375 A1 | 1/2014 | Nam et al. | |
| 2014/0036796 A1* | 2/2014 | Etemad | H04W 4/70 370/329 |
| 2014/0036810 A1 | 2/2014 | Harrison et al. | |
| 2014/0092878 A1 | 4/2014 | Davydov et al. | |
| 2014/0254530 A1 | 9/2014 | Kim et al. | |
| 2014/0301345 A1 | 10/2014 | Kim et al. | |
| 2015/0063142 A1* | 3/2015 | Kim | H04B 7/024 370/252 |
| 2015/0155992 A1* | 6/2015 | Kim | H04B 7/024 370/329 |
| 2015/0195822 A1 | 7/2015 | Han et al. | |
| 2015/0207604 A1 | 7/2015 | Sun et al. | |
| 2015/0215091 A1 | 7/2015 | Lee et al. | |
| 2016/0249380 A1 | 8/2016 | Lee et al. | |
| 2016/0374097 A1 | 12/2016 | Han et al. | |

FOREIGN PATENT DOCUMENTS

| | | |
|---|---|---|
| EP | 2798876 A1 | 11/2014 |
| EP | 2871896 A1 | 5/2015 |
| EP | 2901584 A1 | 8/2015 |
| EP | 2901603 A1 | 8/2015 |
| HK | 1211397 A1 | 5/2016 |
| JP | 2012104951 A | 5/2012 |
| JP | 2012520001 A | 8/2012 |
| JP | 2013533715 A | 8/2013 |
| JP | 2015534394 A | 11/2015 |
| JP | 5984277 B2 | 9/2016 |
| KR | 1020110048422 A | 5/2011 |
| KR | 1020110097623 A | 8/2011 |
| KR | 101655052 B1 | 9/2016 |
| WO | WO-2012021018 A2 | 2/2012 |
| WO | WO-2012043524 A1 | 4/2012 |
| WO | WO-2012094151 A2 | 7/2012 |
| WO | WO-2012099319 A1 | 7/2012 |
| WO | WO-2014052175 A1 | 4/2014 |
| WO | WO-2014052730 A1 | 4/2014 |

OTHER PUBLICATIONS

"U.S. Appl. No. 14/027,401, Final Office Action dated Apr. 1, 2016", 33 pgs.
"U.S. Appl. No. 14/027,401, Non Final Office Action dated Aug. 26, 2015", 35 pgs.
"U.S. Appl. No. 14/027,401, Notice of Allowance dated Jul. 27, 2016", 13 pgs.
"U.S. Appl. No. 14/027,401, Preliminary Amendment filed Dec. 26, 2014", 16 pgs.
"U.S. Appl. No. 14/027,401, PTO Response to Rule 312 Communication dated Oct. 21, 2016", 2 pgs.
"U.S. Appl. No. 14/027,401, PTO Response to Rule 312 Communication dated Oct. 27, 2016", 2 pgs.
"U.S. Appl. No. 14/027,401, Response filed Jul. 1, 2016 to Final Office Action dated Apr. 1, 2016", 12 pgs.
"U.S. Appl. No. 14/027,401, Response filed Dec. 28, 2015 to Non Final Office Action dated Aug. 26, 2015", 18 pgs.
"U.S. Appl. No. 14/125,706, Non Final Office Action dated Sep. 30, 2015", 22 pgs.
"U.S. Appl. No. 14/125,706, Notice of Allowability dated May 20, 2016", 2 pgs.
"U.S. Appl. No. 14/125,706, Notice of Allowance dated Feb. 2, 2016", 10 pgs.
"U.S. Appl. No. 14/125,706, Preliminary Amendment filed Dec. 12, 2013", 14 pgs.
"U.S. Appl. No. 14/125,706, Response filed Dec. 30, 2015 to Non Final Office Action dated Sep. 30, 2015", 66 pgs.

"U.S. Appl. No. 14/125,706, Supplemental Preliminary Amendment filed Dec. 23, 2014", 17 pgs.
"U.S. Appl. No. 15/182,892, Notice of Allowance dated Nov. 4, 2016", 12 pgs.
"U.S. Appl. No. 15/182,892, Preliminary Amendment filed Oct. 5, 2016", 14 pgs.
"U.S. Appl. No. 15/182,892, PTO Response to Rule 312 Communication dated Feb. 3, 2017", 2 pgs.
"Brazilian Application Serial No. BR112015004036-5, Voluntary Amendment filed Jan. 13, 2016", w/o English Translation, 55 pgs.
"Chinese Application Serial No. 201380045150.8, Office Action dated Feb. 4, 2017", w/English Translation, 24 pgs.
"Chinese Application Serial No. 201380045150.8, Preliminary Amendment Filed Oct. 8, 2015", w/ English Claims, 41 pgs.
"Chinese Application Serial No. 201380045150.8, Response filed Jun. 19, 2017 to Office Action dated Feb. 4, 2017", w/ English Claims, 21 pgs.
"Chinese Application Serial No. 201380045563.6, Office Action dated Mar. 28, 2017", w/English Translation, 12 pgs.
"European Application Serial No. 13841050.1, Extended European Search Report dated Mar. 23, 2016", 10 pgs.
"European Application Serial No. 13841050.1,Response filed Oct. 18, 2016 to Extended European Search Report dated Mar. 23, 2016", 22 pgs.
"European Application Serial No. 13842671.3, Extended European Search Report dated May 25, 2016", 9 pgs.
"European Application Serial No. 13842671.3, Response filed Dec. 12, 2016 to Extended European Search Report dated May 25, 2016", 27 pgs.
"HARQ-ACK PUCCH Resources in Response to E-PDCCH Detections", Samsung, R1-121647, 3GPP, (Mar. 20, 2012).
"HARQ-ACK Transmission in Response to E-PDCCH Detection", Samsung, 3GPP TSG RAN WG1#68 R1-120193, (Jan. 10, 2012), 3 pgs.
"International Application Serial No. PCT/US2013/060800, International Preliminary Report on Patentability dated Apr. 9, 2015", 6 pgs.
"International Application Serial No. PCT/US2013/060800, International Search Report dated Jan. 16, 2014", 3 pgs.
"International Application Serial No. PCT/US2013/060800, Written Opinion dated Jan. 16, 2014", 4 pgs.
"International Application Serial No. PCT/US2013/062132, International Preliminary Report on Patentability dated Apr. 9, 2015", 8 pgs.
"International Application Serial No. PCT/US2013/062132, International Search Report dated Jan. 28, 2014", 3 pgs.
"International Application Serial No. PCT/US2013/062132, Written Opinion dated Jan. 28, 2014", 6 pgs.
"Japanese Application Serial No. 2015-528726, Office Action dated Nov. 4, 2015", W/ English Translation, 9 pgs.
"Japanese Application Serial No. 2015-528726, Response filed Feb. 4, 2016 to Office Action dated Nov. 4, 2015", W/ English Translation, 11 pgs.
"Japanese Application Serial No. 2015-534731, Notice of Reasons for Rejection dated Mar. 1, 2016", W/ English Translation, 8 pgs.
"Japanese Application Serial No. 2015-534731, Response filed Jun. 1, 2016 to Notice of Reasons for Rejection dated Mar. 1, 2016", with English translation of claims, 53 pgs.
"Korean Application Serial No. 2015-7004962, Notice of Preliminary Rejection dated Feb. 5, 2016", (English Translation), 11 pgs.
"Korean Application Serial No. 2015-7004962, Response filed May 4, 2016 to Notice of Preliminary Rejection dated Feb. 5, 2016", W/ English Translation of Claims, 28 pgs.
"Korean Application Serial No. 2015-7005066, Office Action dated Mar. 29, 2017", W/ English Translation, 4 pgs.
"Korean Application Serial No. 2015-7005066, Office Action dated Sep. 13, 2016", W/ English Translation, 9 pgs.
"Korean Application Serial No. 2015-7005066, Response filed May 23, 2017 to Office Action dated Mar. 29, 2017", w/ English Claims, 29 pgs.
"Korean Application Serial No. 2015-7005066, Response filed Nov. 14, 2016 to Office Action dated Sep. 13, 2016", W/ English Claims, 61 pgs.

(56) References Cited

OTHER PUBLICATIONS

"Korean Application Serial No. 2016-7023863, Office Action dated Nov. 17, 2016", w/English Translation, 8 pgs.
"Korean Application Serial No. 2016-7023863, Response filed Jan. 17, 2017 to Office Action dated Nov. 17, 2016", w/ English Claims, 14 pgs.
"PUCCH Resource Allocation Corresponding to ePDCCH", R1-120666, 3GPP TSG RAN WG1 Meeting #68. ASUSTEK., (Feb. 2012), 2 pgs.
"PUCCH resource allocation for E-PDCCH", R1-120329, 3GPP TSG RAN1 #68. Pantech., (Feb. 2012), 2 pgs.
"PUCCH resource for ePDCCH", Mobile Competence Centre , 3GPP Draft, (Aug. 5, 2012), 9 pgs.
"PUCCH resource mapping with ePDCCH", R1-114066, 3GPP TSG RAN WGI Meeting #67. Alcatel-Lucent Shanghai Bell, Alcatel-Lucent., (Nov. 2011), 2 pgs.
"R1-121935: Interference Measurement Mechanism for Rel-11", 3GPP TSG RAN WG1 Meeting #69, (May 2012), 10 pgs.
"R1-124046: Final Report of 3GPP TSG RAN WG1 #70 v1.0.0", 3GPP TSG RAN WG1 Meeting #70bis, (Oct. 2012), 118 pgs.
"Remaining Issues on Resource Allocation for TDD PUCCH format 3", LG Electronics, R1-111692, 3GPP, (May 3, 2011).
"Views on PUCCH Resource Allocation for ePDCCH", NTT DOCOMO, R1-123554, 3GPP, (Aug. 5, 2012).
"WF on PUCCH Format 1a/1b resource allocation for ePDCCH based HARQ-ACKs", Sharp, Nokia Siemens Networks, Nokia, Samsung, Docomo, WF R1-123975, 3GPP, (Aug. 17, 2012).
Huawei, Hisilicon, "Remaining details of CSI-RS configuration", 3GPP TSG-RAN WG1#68b R1-120984, [Online]. Retrieved from the Internet:, (Mar. 30, 2012).
"Chinese Application Serial No. 201380045563.6, Office Action dated Oct. 11, 2017", w/ Concise Statement of Relevance, 9 pgs.
"Chinese Application Serial No. 201380045563.6, Response filed Aug. 14, 2018 to Office Action dated Mar. 28, 2017", w/ English Claims, 27 pgs.
"Chinese Application Serial No. 201380045563.6, Response filed Dec. 25, 2017 to Office Action dated Oct. 11, 2017", w/ English Claims, 27 pgs.
"Chinese Application Serial No. 201380045150.8, Office Action dated Sep. 30, 2017", w/English Translation, 6 pgs.
"Chinese Application Serial No. 201380045150.8, Response filed Dec. 15, 2017 to Office Action dated Sep. 30, 2017", w/ English Claims, 41 pgs.

\* cited by examiner

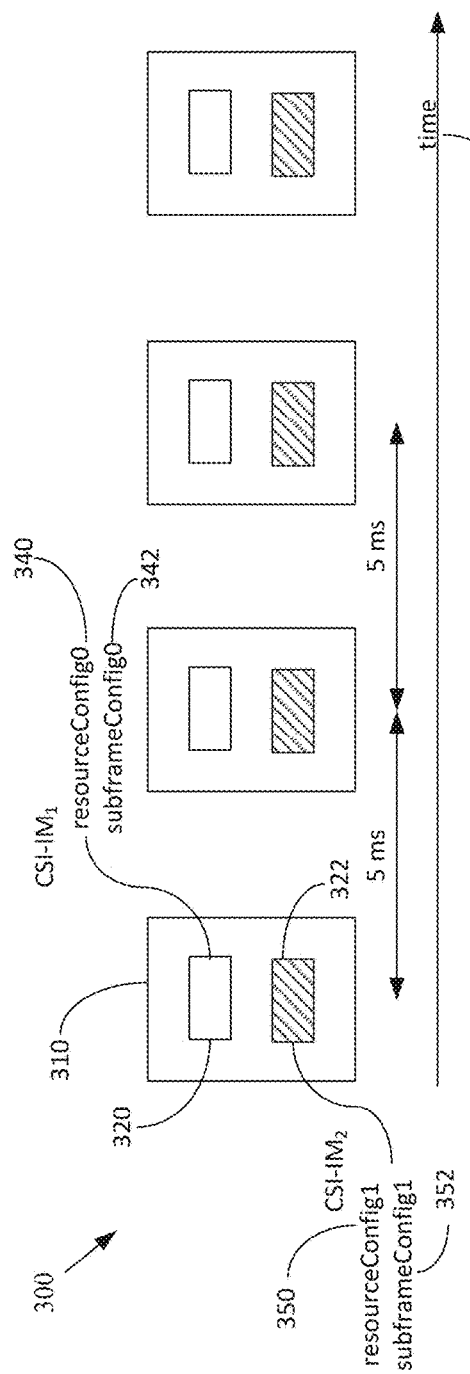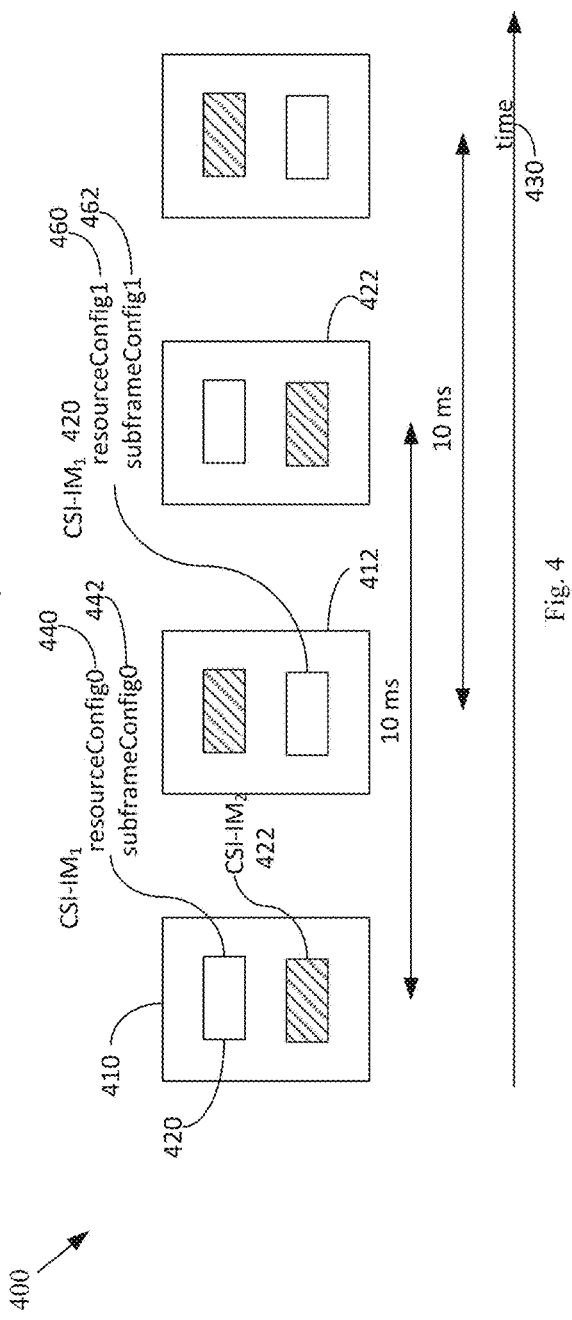

900

| CSI Reference Signal Subframe Configuration | | |
|---|---|---|
| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Fig. 9

METHOD OF ENHANCED INTERFERENCE MEASUREMENTS FOR CHANNEL STATE INFORMATION (CSI) FEEDBACK

This application is a continuation of U.S. patent application Ser. No. 14/027,401, which claims the benefit of priority to U.S. patent application Ser. No. 14/027,401, filed on Sep. 16, 2013, which claims the benefit of priority to U.S. Provisional Patent Application Ser. No. 61/707,784, filed on Sep. 28, 2012, all of which are incorporated herein by reference in their entireties.

BACKGROUND

Coordinated Multi-Point (CoMP) transmission/reception has been proposed as a promising technology to meet the 3GPP (Third Generation Partnership Project) LTE-Advanced (LTE-A) requirements by improving performance of cell-edge UEs in particular. In CoMP operation, multiple transmission/reception points (typically geographically separated, but could also be co-located) cooperatively transmit to or receive from one or more users' equipment (UEs) to improve performance, especially the performance of cell-edge UEs. In the case of downlink CoMP, each transmission point, which can have one or more transmit antennas, is a radio unit whose signal covers a geographical area. In general, CoMP techniques refer to a broad range of coordination mechanisms including interference avoidance. CoMP can be used to improve the throughput for cell edge UEs as well as the cell average throughput.

In LTE CRSs may be used by UEs to measure properties of the radio channel with respect to such CSI parameters as a Channel Quality Indicator, CQI. CSI reference signals (CSI-RS) may be also used by terminals to acquire channel-state information. CSI-RS have a significantly lower time/frequency density, thus implying less overhead, compared to the CRS. In CoMP systems the channel measurement for CSI feedback are based on CSI-RS.

For purpose of CSI feedback, interference can be measured on CRS after subtracting channel information from received signals or directly on the channel state information interference measurement resources (CSI-IM) indicated by the network. In CoMP systems the interference measurements for CSI are based on CSI-IM due to its flexibility in supporting measurement for different interference scenarios. However the interference measurement using CSI-IM in some cases may be less accurate than interference measurements cell-specific reference signal (CRS). The less accurate interference measurements on CSI-IM results from the usage of the resource elements (REs) of zero-power channel state information reference signal (ZP CSI-RS) which in case of overlap with another CSI-IM configured on another cell may not capture interference from some of the transmission points.

In contrast, CRS based measurements in the same cases may include interference contribution from the transmitting points even when CRS overlap. This indicates that for high loading scenario, CRS based interference measurements may be more accurate than interference measurements on CSI-IM primary due to smaller number of CSI-IM configurations than CRS sequences.

For CSI-IM interference measurements network indicates to a UE which resource elements (i.e. subcarrier and symbols) the UE is to use to perform interference measurements. The serving cell (node) may not transmit any data on a given resource elements to remove own-cell interference, which can be achieved by configuring ZP CSI-RSs on the same resource elements. The other nodes will transmit data on specified resource elements. Thus, the UE measures interference from the other nodes, e.g., coordinating or neighboring cells. A similar CSI-IM measurements and configurations may be applied in the neighboring nodes. However, due to the limited number of configurations available, collisions between CSI-IM of different nodes will occur. Thus interference from some nodes will not be estimated because of the collisions. This leads to under estimation of interference for CSI feedback.

BRIEF DESCRIPTION OF THE DRAWINGS

FIG. 3 illustrates usage of a current CSI-IM resource configuration;

FIG. 4 illustrates usage of CSI-IM resource configuration according to an embodiment;

FIG. 9 show a table of the parameters for CSI-RS subframe configuration for CSI-IM according to an embodiment;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Embodiments provide enhanced interference measurements for CSI feedback. CSI-IM resources are used by UE to perform interference measurements. According to an embodiment, CSI-IM hopping and/or an increase in a number of CSI-IM resources may be used to provide enhanced interference measurements for CSI feedback.

Figure 1:
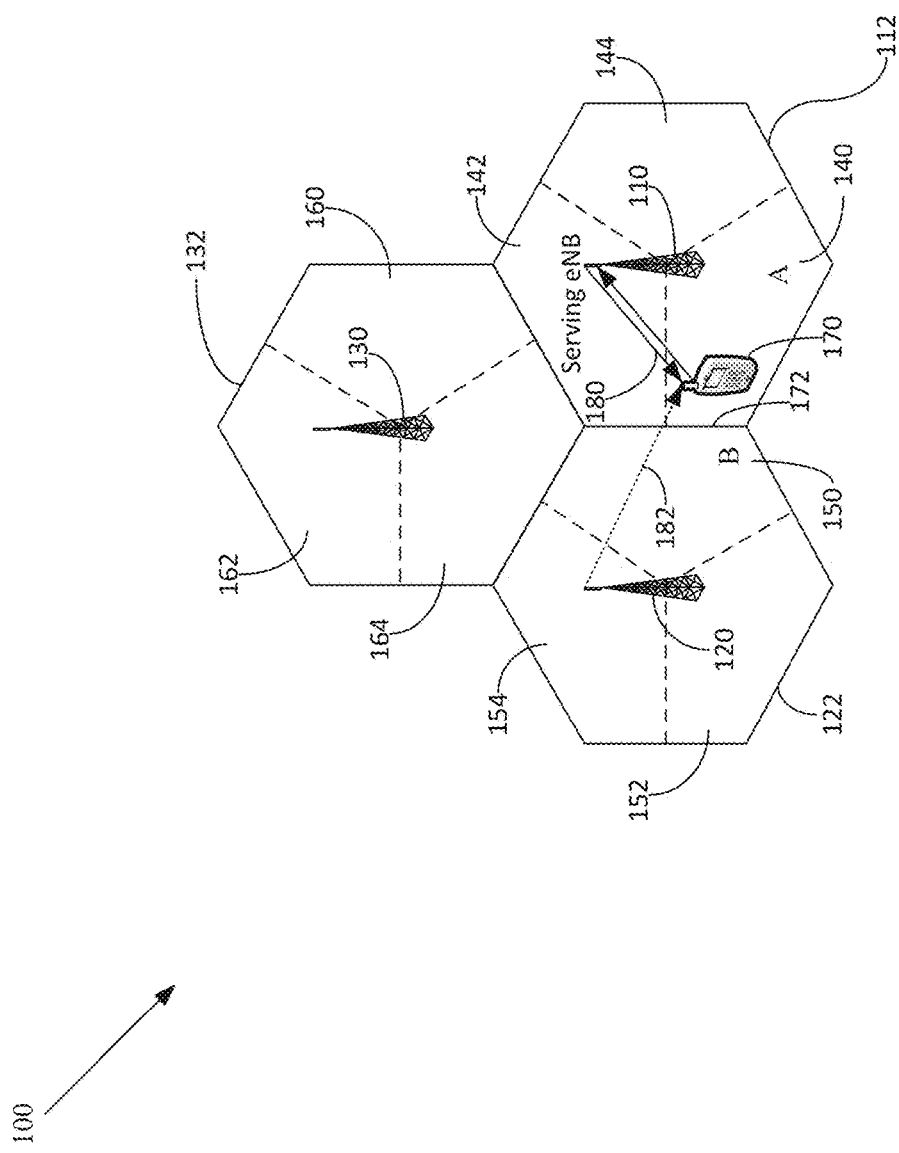
FIG. 1 illustrates a wireless telecommunications network according to an embodiment.

FIG. 1 illustrates a wireless telecommunications network 100 according to an embodiment. The illustrative telecommunications network includes eNBs 110, 120 and 130. A telecommunications network may include many more eNBs. Each of eNBs 110, 120 and 130 are operable over corresponding coverage areas or cells 112, 122 and 132. Each base station's coverage area 112, 122 and 132 may further be divided into three sectors, e.g., sectors 140, 142, 144, 150, 152, 154, and 160, 162, 164, respectively. In some cases each sector of eNB can be also viewed as a cell. Handset or other user equipment (UE) 170 is shown in sector A 140. Sector A 140 is within coverage area 112 of eNB 110. UE 170 transmits to and receives transmissions from eNB 110. As UE 170 moves out of Sector A 140 and into Sector B 150, UE 170 may be handed over to eNB 120.

In FIG. 1, UE 170 is shown approaching a cell edge 172 and is serviced by serving eNB 110, UE 170 receives serving signal 180 from serving eNB 110. As UE 170 approaches the cell edge 172, the interference 182 from the neighboring eNB 120 becomes stronger. UE 170 may be configured by eNB 110 to perform channel and interference measurements using CSI-RS and CSI-IM for CSI feedback.

Performance at the cell-edge 172 is particularly susceptible to inter-cell interference (ICI) 182. Improvements to the performance at the cell-edge 172 according to an embodiment may be implemented. As illustrated above, as UE 170 moves away from the serving eNB 110, the degradation in its SINR can be attributed to two factors. The signal strength of the received serving signal 180 decreases and ICI 182 increases as the UE 170 moves closer to a neighboring eNB 120.

Figure 2:
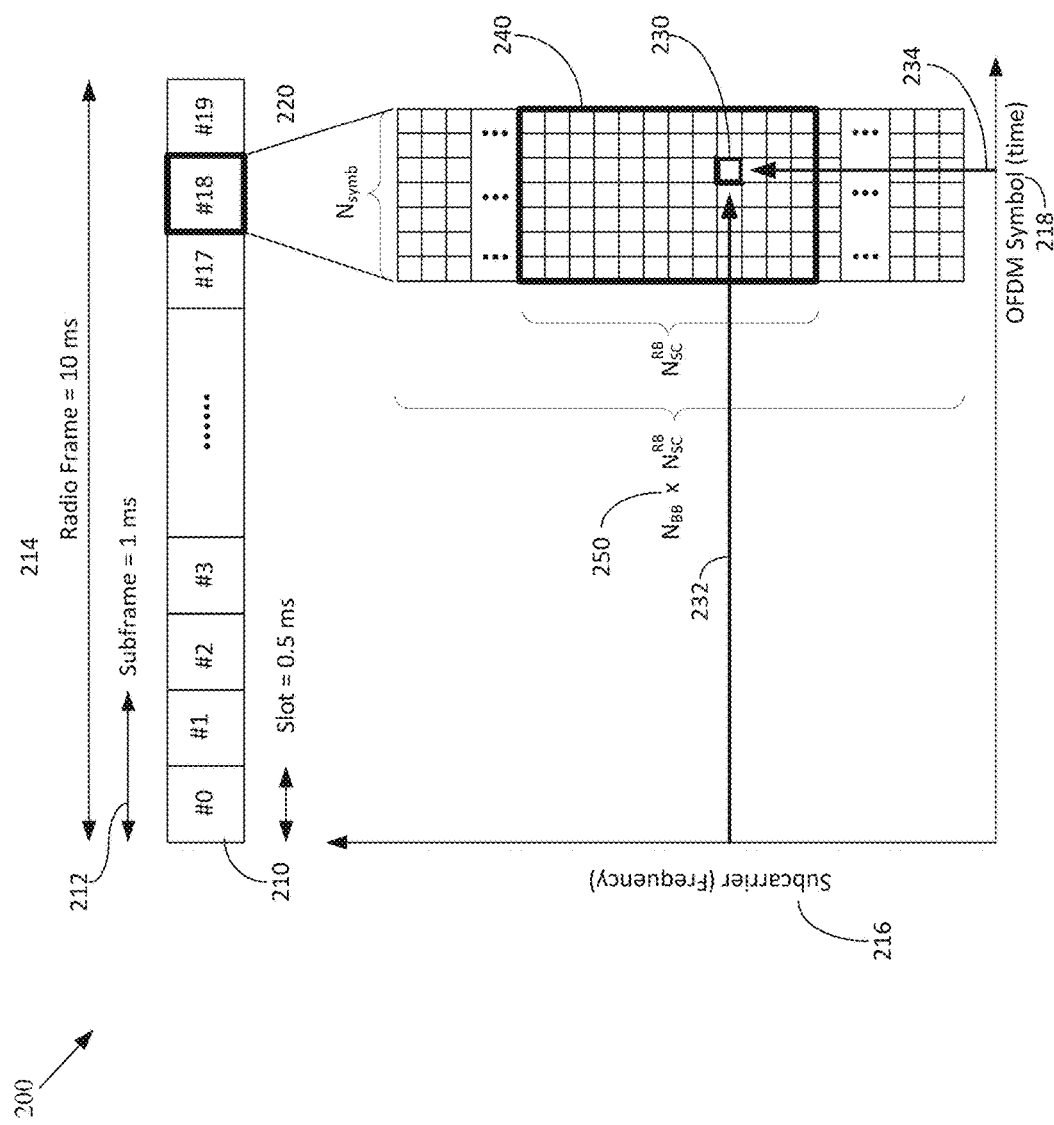
FIG. 2 illustrates a frame structure according to an embodiment.

FIG. 2 illustrates a radio frame structure 200 according to an embodiment. In FIG. 2, the radio frame 200 has an overall length of 10 ms 214. This is then divided into a total of 20 individual slots 210. Each subframe 212 includes of two slots 210 of length 0.5 ms, and each slot 210 contains a number of OFDM symbols, $N_{symb}$ 220. Thus, there are 10 subframes 212 within frame 200. Subframe #18 is shown expanded with reference to a subcarrier (frequency) axis 216 and an OFDM symbol (time) axis 218.

A resource element (RE) 230 is the smallest identifiable unit of transmission and includes a subcarrier 232 for an OFDM symbol period 234. Transmissions are scheduled in larger units called resource blocks (RBs) 240 which comprise a number of adjacent subcarriers 232 for a period of one 0.5 ms timeslot. Accordingly, the smallest dimensional unit for assigning resources in the frequency domain is a "resource block" (RB) 240, i.e., a group of $N_{sc}^{RB}$ adjacent subcarriers 232 constitute a resource block (RB) 240. Each subframe 212 includes "$N_{RB}$" resource blocks, i.e., the total number of the subcarriers within subframe $N_{RB} \times N_{sc}^{RB}$ 250.

The CSI-IM resource elements may be configured as resource elements of zero-power (ZP) CSI-RS. ZP CSI-RS may be referred to as muted CSI-RSs or muted resource elements (REs). A zero-power CSI-RS is a CSI-RS pattern wherein the resource elements are not used, i.e., there is no transmitted signal on those resource elements. In some cases zero-power CSI-RS is a set of REs, where UE may assume no transmission. Therefore, a ZP CSI-RS has the same structure as a non-muted CSI-RS except that nothing is actually transmitted on the corresponding resource elements. One use of ZP CSI-RS is to be able to create "transmission holes" corresponding to data transmissions in other (neighboring) cells to facilitate interference measurement using CSI-IM. Another intention of ZP CSI-RS is to be able to create "transmission holes" corresponding to actual CSI-RS transmissions in other (neighboring) cells. This makes it possible for a terminal to receive CSI-RS of neighboring cells without interference from CSI-RS transmissions in its own cell. Accordingly, ZP CSI-RSs may be used to raise the signal-to-interference-plus-noise ratio (SINR) for CSI-RS in a given cell by configuring ZP CSI-RS in interfering cells so that the resource elements that otherwise cause interference are silent.

One or several CSI-IMs may be configured by the network for the purpose of interference measurements (e.g. to have different interference measurements for CSIs corresponding to data blanking or data transmission from cooperating node(s)).

FIG. 3 illustrates usage of a current CSI-IM resource configuration 300. The illustration in FIG. 3 is a simplified representation. However, those skilled in the art will generalize CSI-IM representation in accordance to the LTE specification. In FIG. 3, subframes 310 having two CSI-IMs 320, 322 are shown over time 330. $CSI-IM_1$ 320 in FIG. 3 is configured by two parameters resourceConfig0 340 and subframeConfig0 342. The parameter, resourceConfig0 340 defines the positions of the CSI-IM resources for $CSI-IM_1$ 320 within a subframe. The subframeConfig0 342 defines the CSI-IM periodicity and the CSI-IM subframe offset for $CSI-IM_1$ 320. $CSI-IM_2$ 322 similarly includes resourceConfig1 350 and subframeConfig1 352 parameters which may be different than resourceConfig0 340 and subframeConfig0 342 of $CSI-IM_1$. Over time, the CSI-IMs are mapped in the subframes in a defined manner. For example, in FIG. 3, each subframe shows $CSI-IM_1$ at a first position and $CSI-IM_2$ at a second position. Thus, the CSI-IM resources 320, 322 have a fixed position in the subframes 310. In the case of interference measurements ZP CSI-RS resources may be configured on the REs where CSI-IM resources ($CSI-IM_1$ and $CSI-IM_2$) are configured for the UE to remove own-cell interference and to capture interference from neighboring cells.

FIG. 4 is simplified illustration of CSI-IM resource configuration 400 according to an embodiment. Enhanced interference measurements are provided by using CSI-IM hopping and/or by increasing the number of possible CSI-IM resources according to an embodiment. In accordance to the embodiment CSI-IM configuration for enhanced interference measurement may include additional parameters set resourceConfig1 and subframeConfig1 to increase the number of CSI-IM resources and/or provide CSI-IM resource hopping in time.

FIG. 4 shows subframes 410 having two CSI-IMs 420, 422 transmitted over time 430 according to an embodiment. However, those skilled in the art will recognize extended CSI-IM configuration with additional CSI-IM resources and more complex CSI-IM resource hopping may be implemented. $CSI-IM_1$ 420 in FIG. 4 includes two parameters {resourceConfig0 440, subframeConfig0 442} and {resourceConfig1 460, subframeConfig1 462}. However, there may be only one resourceConfig that is used with different subframe types, e.g., one resourceConfig and a plurality of subframeConfig. Similarly $CSI-IM_2$ may also include two parameter sets. However the embodiments described herein are not meant to be limited in this respect. In FIG. 4, $CSI-IM_2$ 422 is shown in the same position, i.e., position 2, as illustrated above with reference to FIG. 3. However, the second subframe 412 in FIG. 4 shows $CSI-IM_1$ 420 in the second position corresponding to additional parameters resourceConfig1 460 and subframeConfig1 462. In the same subframe $CSI-IM_2$ 422 has hopped to the first position. As can be seen in the subsequent subframes, $CSI-IM_1$ 420 and $CSI-IM_2$ 422 continue to hop to a different position each subframe. In some embodiments the CSI-IM configuration can be enhanced by using one additional parameter resourceConfig1 460 or subframeConfig1 462.

As shown in FIG. 4, resource elements used by a UE to perform interference measurements will hop in the time domain. If a CSI-IM collision happens to occur on one subframe, e.g., subframe 420, a collision is unlikely on the next subframe, e.g., subframe 422. The position parameter, resourceConfig0 440 defines the positions of the CSI-IM resources for CSI-IM$_1$ 420. The subframeConfig0 442 defines the CSI-IM periodicity and the CSI-IM subframe offset for CSI-IM$_1$ 420. In FIG. 4, the resourceConfig0 440 defines a CSI-IM position in the subframe with periodicity of 10 ms. Thus, subframe 410 repeats again after 10 ms. The position of CSI-IM$_1$ in subframe 412 is defined by resourceConfig0 460, which is also have periodicity of 10 ms in FIG. 4. The subframe shift for CSI-IM$_1$ is defined by subframeConfig0 442 and subframeConfig1 462. Thus, in FIG. 4, the subframe shift is 5 ms and the CSI-IM$_1$ resource hop after 5 ms. A similar configuration is shown for CSI-IM$_2$ which also provides CSI-IM hop after 5 ms.

In another embodiment pseudo-random hopping of CSI-IM may be implemented to avoid or reduce the likelihood of the occurrence of collisions. If the hopping of CSI-IM is enabled, the CSI-IM resources within subframe in the cells changes in every time slot or subframe in a pseudo-random fashion, thus avoiding systematic collisions of the CSI-IM in the neighboring cells.

CSI-IM resource hopping may be limited to the pool of CSI-IM resources which may be subset of the configured resources ZP CSI-RS resources. The pool CSI-IM resources may be configured by the radio resource control (RRC) protocol message. The particular CSI-IM resource from the CSI-IM pool can be determined in accordance to the pseudo-random sequence generated using seed $c_{init}$, where $c_{init}$ may be a function of slot index, symbol, physical Cell ID and cyclic prefix (CP) type. The generated pseudo-random sequence is then limited to the maximum number of the available CSI-IM configurations (resources) within the configured CSI-IM resource pool.

The CSI-IM resource index $\delta'_{IM}$ from the CSI-IM resource pool which may be used for interference measurement on a given slot or subframe, may be determined according to:

$$\delta'_{IM} = P_{CSI-IM}\{(f_{ih}(n_s) + \delta_{IM}) \bmod N_{CSI-IM}\}$$

where $\delta_{IM}$ is the CSI-IM index corresponding to the configured CSI-IM for the UE by resourceConfig, $n_s$ is the slot or subframe number, $P_{CSI-IM}$ is the CSI-IM resource pool, $f_{ih}$ is a random value for selecting a CSI-IM from $P_{CSI-IM}$, and $N_{CSI-IM}$ is a total number of CSI-IM resources in the configured CSI-IM resource pool.

The pseudo-random sequence hopping function can be defined by $$f_{ih}(n_s) = \begin{cases} 0 \\ \left(\sum_{i=0}^{7} c(8\lfloor n_s/2 \rfloor + i) \cdot 2^i\right) \bmod N_{CSI-IM} \end{cases}$$

if CSI-IM hopping is disabled
if CSI-IM hopping is enabled,
where the pseudo-random sequence c(i) may be initialized with $c_{init}$ at the beginning of each radio frame or set of radio frames. The function $f_{ih}(n_s)$ identifies a CSI-IM to randomly select from the CSI-IM resource pool, $P_{CSI-IM}$. According to an embodiment, pseudo-random sequences may be determined from a length-31 Gold sequence. The output sequence c(n) of length $M_{PN}$, where n=0, 1, . . . , $M_{PN}$−1, is defined by $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_C$=1600 and the first m-sequence shall be initialized with $x_1(0)$=1, $x_1(n)$=0, n=1, 2, . . . , 30. The initialization of the second m-sequence is denoted by $c_{init} = \sum_{i=0}^{30} x_2(i) \cdot 2^i$.

To ensure the planning of CSI-IM resources within coordinated multipoint transmission and reception (CoMP) cluster, the same hooping pattern may be used by cooperating cells by using the same $c_{init}$ value. The parameter $c_{init}$ can be independently configured for the UE using RRC signaling or derived from the physical cell ID, virtual cell ID value $n_{ID}$ of one of configured CSI-RS resources.

Figure 5:
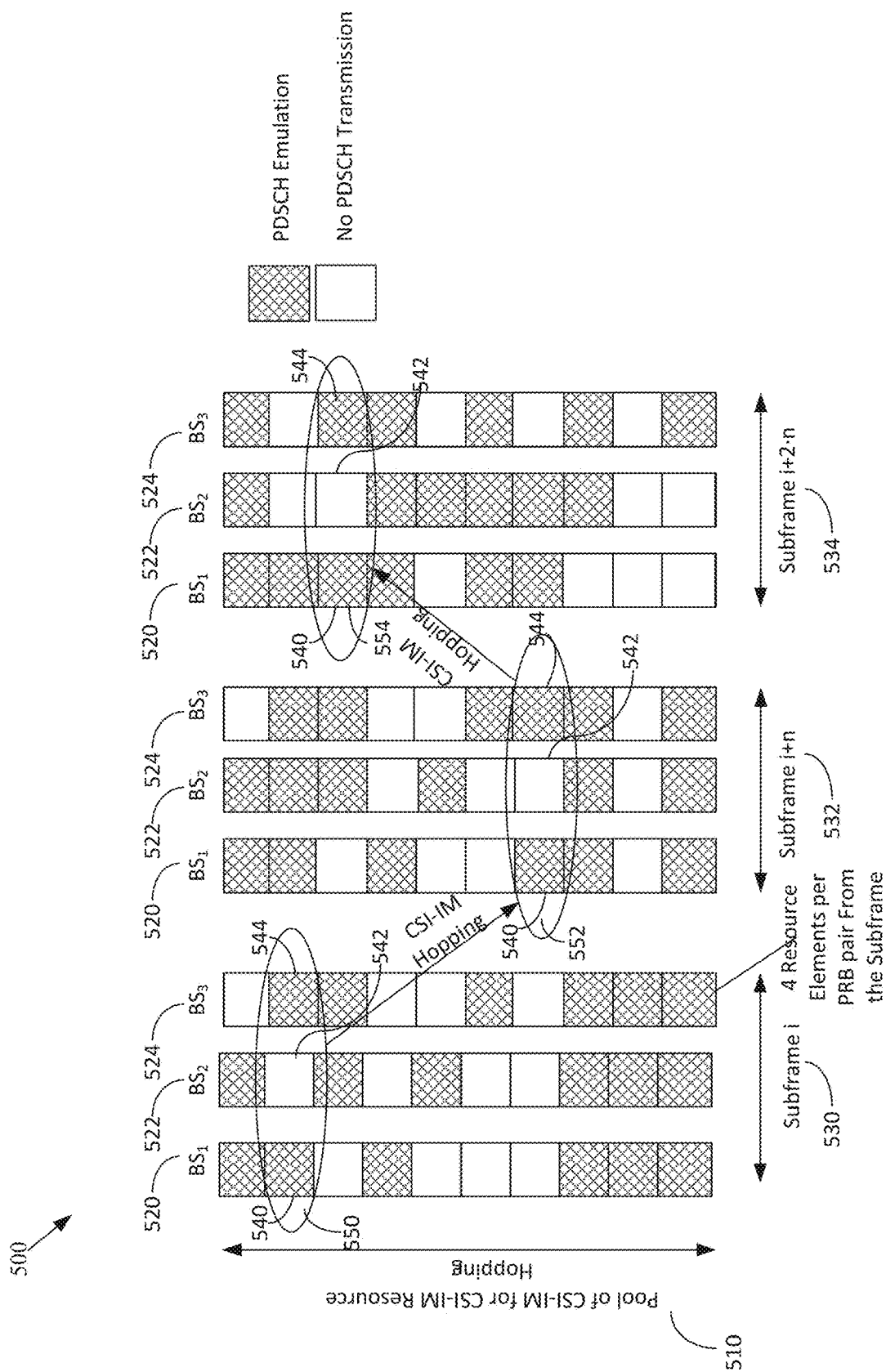
FIG. 5 illustrates CSI-IM hopping in a time domain according to an embodiment.

FIG. 5 illustrates CSI-IM hopping in a time domain 500 according to an embodiment. On a given subframe the actual CSI-IM for interference measurements is selected by the UE from a set $P_{CSI-IM}$ 510. e.g., a pool of CSI-IM resources which may be subset of configured ZP CSI-RS resources. FIG. 5 shows the example of CSI-IM hopping for the more general case of CoMP system with three base stations (BS), BS$_1$ 520, BS$_2$ 522, BS$_3$ 524. In subframe i 530, a pool of CSI-IM resources for CSI-IM resource hopping for three base stations (BS), BS$_1$ 520, BS$_2$ 522, BS$_3$ 524, is shown.

In subframe i 530, PDSCH emulation 540, 544 is provided in resource elements corresponding to columns 1 and 3 of the second row 550, wherein columns 1 and 3 correspond to BS$_1$ 520 and BS$_3$ 524. No PDSCH transmission 542 is performed on the REs of CSI-IM resource as shown in the second row 550 of the second column corresponding to BS$_2$ 522. In subframe i+n 532, no PDSCH transmission for BS$_2$ 522 and PDSH emulation 540, 544 for BS$_1$ 420 and BS$_3$ 524 are used in row seven 552. In subframe i+2·n 534, the ZP CSI-RS 542 for BS$_2$ 522 and PDSH emulation 540, 544 for BS$_1$ 520 and BS$_3$ 524 are used in row three 554. By randomly hopping of CS-IM 542, CSI-IM collisions between the CoMP cluster of BS$_1$ 520, BS$_2$ 522, BS$_3$ 524 and another CoMP cluster are reduced.

Figure 6:
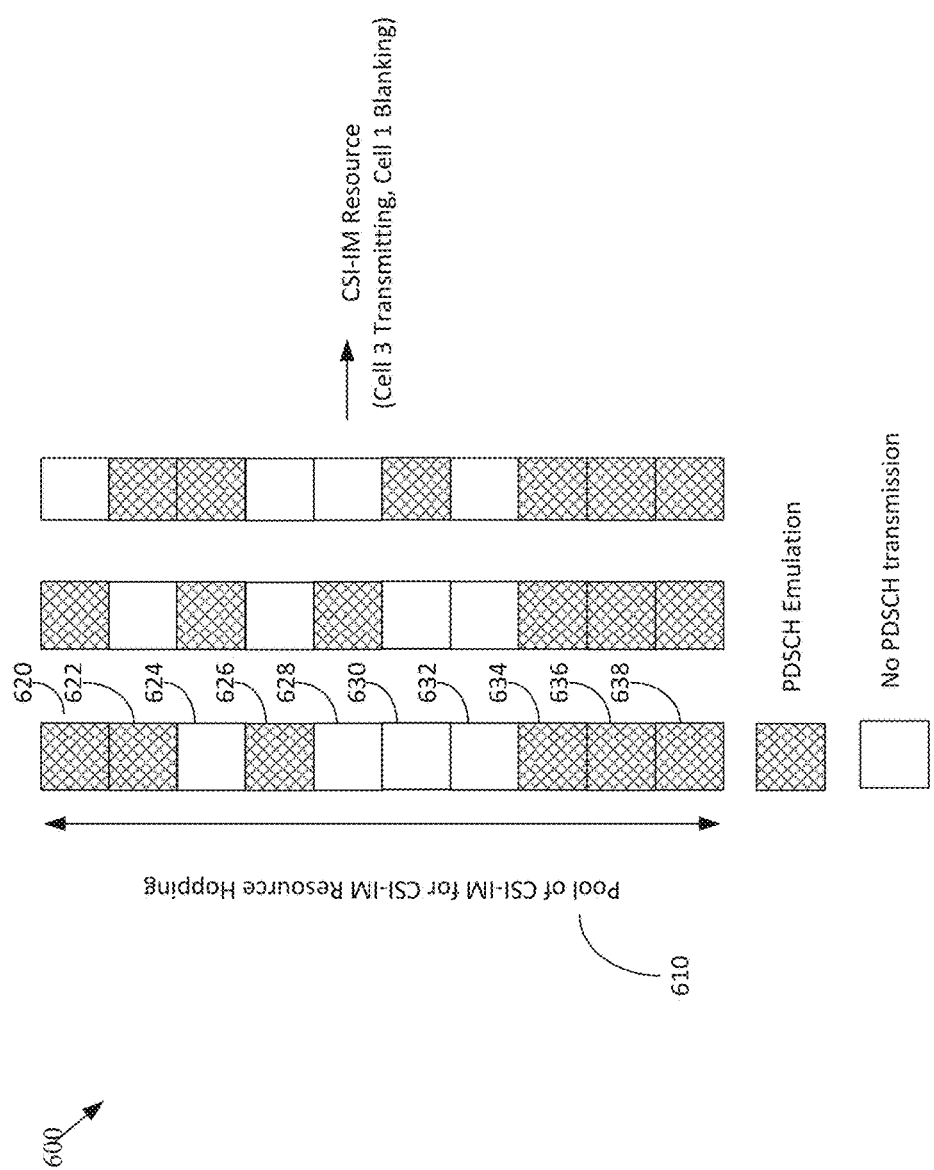
FIG. 6 shows an CSI-IM pool according to an embodiment.

FIG. 6 shows a CSI-IM pool 600 according to an embodiment. A pool 610 of CSI-IM resources for CSI-IM hopping is provided. In FIG. 6, the pool 610 includes 10 CSI-IM 620-638 for interference measurement hopping. To enable CQI calculation for different interference hypothesis, seven CSI-IM resources are configured, e.g., 620, 622, 626, 634, 636, 638, having cells transmit data, and resources 624, 628, 630, 632 are configured not to transmit data. To avoid the potential issues with PDSCH RE mapping, the PDSCH transmission on CSI-IM pool 610 may be avoided by configuring ZP CSI-RS resources on the resource elements of CSI-IM pool. As PDSCH transmission is not performed on ZP CSI-RS the evolved NodeB (eNB) may need to emulate PDSCH transmission on some resource elements within CSI-IM pool to guarantee interference measurements at the UE according to the interference hypothesis set for the particular CSI-IM resource. Referring to CSI-IM in the first row, the cell associated with first column and the cell associated with the second columns transmit data, but the cell associated with third columns does not transmit data. Thus, the UE measuring interference on the REs corresponding to the first row will capture interference for the cell associated with columns 1 and the cell associated with columns 2.

Figure 7:
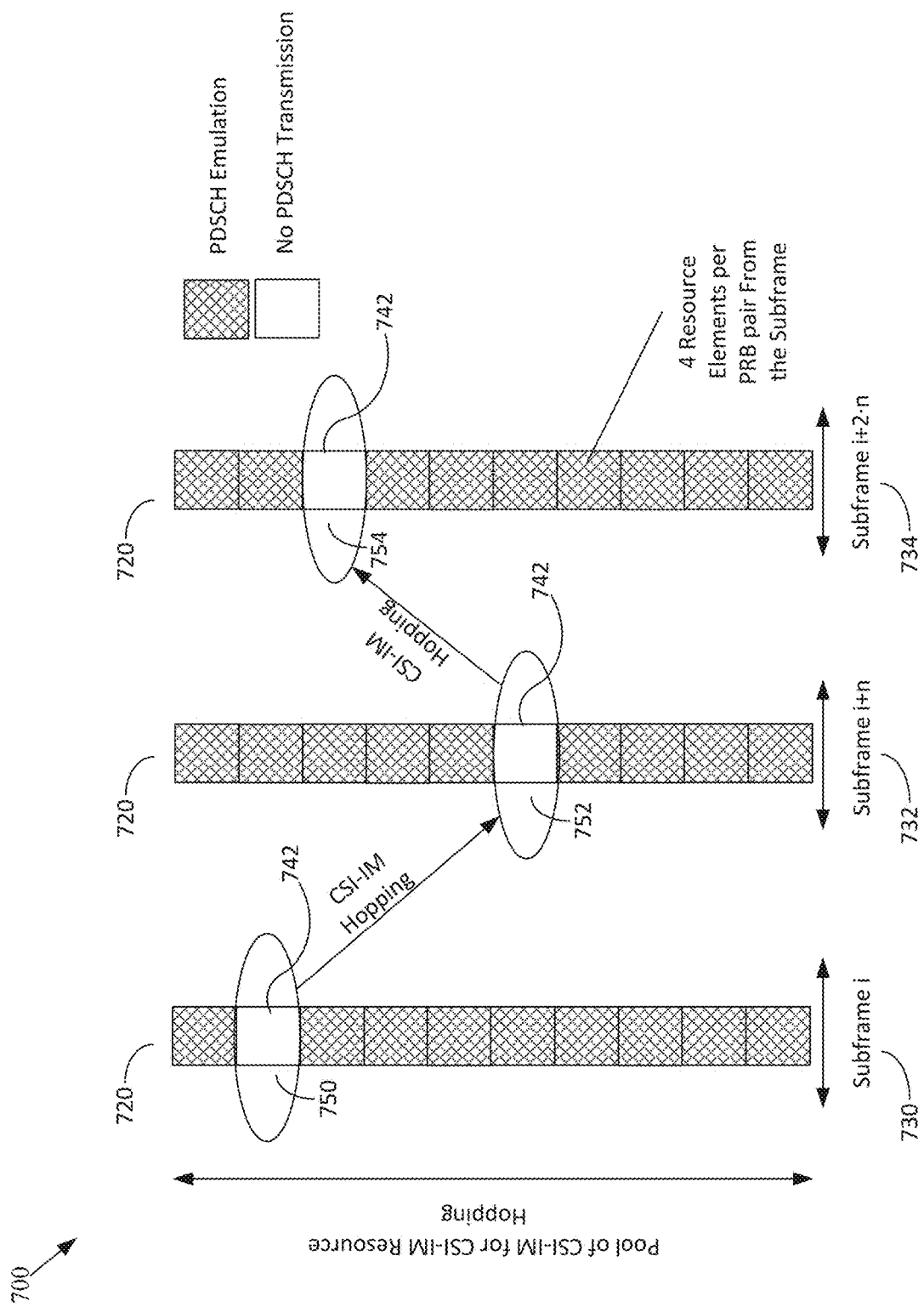
FIG. 7 illustrates a simpler case of CSI-IM hopping in a time domain according to an embodiment.

FIG. 7 illustrates a simpler case of CSI-IM hopping in a time domain 700 according to an embodiment. In FIG. 7, one BS 720 is shown without support for CoMP according to an embodiment. A CSI-IM 742 is time hopped from row two 750, to row six 752, to row three 754 in subframes i 730, i+n 732 and i+2·n 734, respectively.

Figure 8:
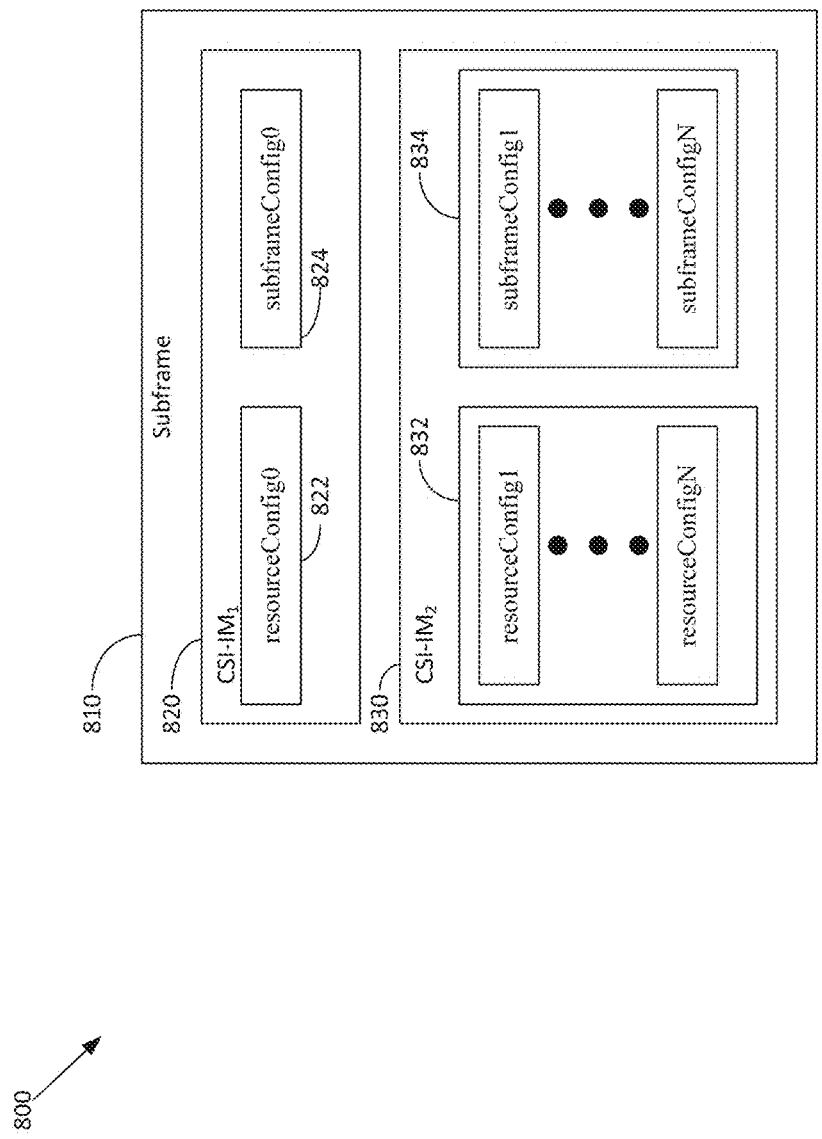
FIG. 8 illustrates the use of more than one CSI-IM configuration extension according to an embodiment.

FIG. 8 illustrates the use of more than one CSI-IM configuration 800 according to an embodiment. In FIG. 8 a subframe 810 is shown with two CSI-IM resources, CSI- IM₁ 820, CSI-IM₂ 830. CSI-IM₁ 820 includes subframeConfig0 822 and resourceConfig0 824. CSI-IM₂ 830 includes subframeConfig1-N 832 and subframeConfig 1-N 834. Thus, a CSI-IM resource, e.g., CSI-IM₂ 830, may indicate more resource elements for interference measurements than CSI-IM₁.

FIG. 9 show a table 900 of the parameters for CSI-RS subframe configuration which are used for CSI-IM subframe configuration (subframeConfig parameter) according to an embodiment. For subframes configured for CSI-RS transmission, the reference signal sequence $r_{l,n_s}(m)$ is mapped to complex-valued modulation symbols ak,l(p) used as reference symbols. Thus, the parameter resourceConfig gives the RE pattern of the CSI-RS within the sub-frame or in other words defines the pattern of CSI-RS used within a subframe. In FIG. 9, the table shows CSI-RS periodicity $T_{CSI-RS}$ 910 and CSI-RS subframe offset $\Delta CSI-RS$ 920 for a range of CSI-RS subframe configurations 940. For example, the CSI-RS periodicity $T_{CSI-RS}$ 920 is 5 subframes 912 for CSI-RS subframeConfig 0-4 942 and the CSI-RS subframe offset $\Delta CSI-RS$ 920 is 0 922. Thus, the CSI-RS periodicity $T_{CSI-RS}$ 920 may range from T=5 to 80 subframes. The offset may range from 0 to 79 subframes. Accordingly, a CSI-IM resource configuration may include resourceConfig0, subframeConfig0. The CSI-IM resource configuration may also include resourceConfig1 and subframeConfig1.

Figure 10:
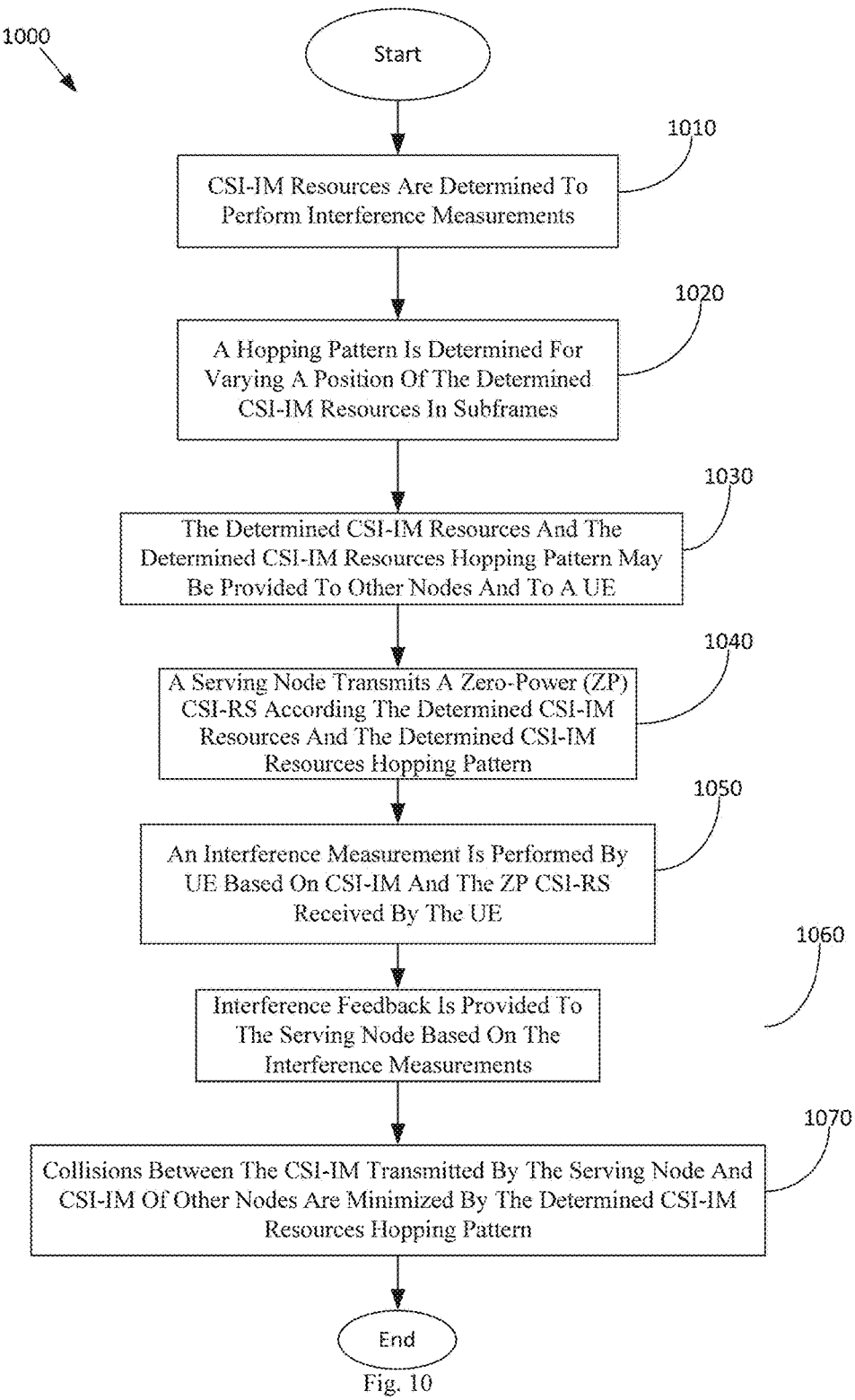
FIG. 10 is a flow chart of a method for providing enhanced interference measurements for CSI feedback according to an embodiment.

FIG. 10 is a flow chart 1000 of a method for providing enhanced interference measurements for CSI feedback according to an embodiment. In FIG. 10, CSI-IM resources are determined to perform interference measurements 1010. A hopping pattern is determined for varying a position of the determined CSI-IM resources in subframes 1020. The determined CSI-IM resources and the determined CSI-IM resources hopping pattern are provided to other nodes and a UE 1030. A serving node may configure a zero-power (ZP) CSI-RS according to the determined CSI-IM resources and the determined CSI-IM resources hopping pattern 1040. An interference measurement is performed by UE based on CSI-IM received by the UE and the ZP CSI-RS. Channel state information feedback is provided to the serving node based on the interference measurements 1060. Collisions between the CSI-IM of the serving node and CSI-IM of other nodes are minimized by the determined CSI-IM resources hopping pattern 1070.

Figure 11:
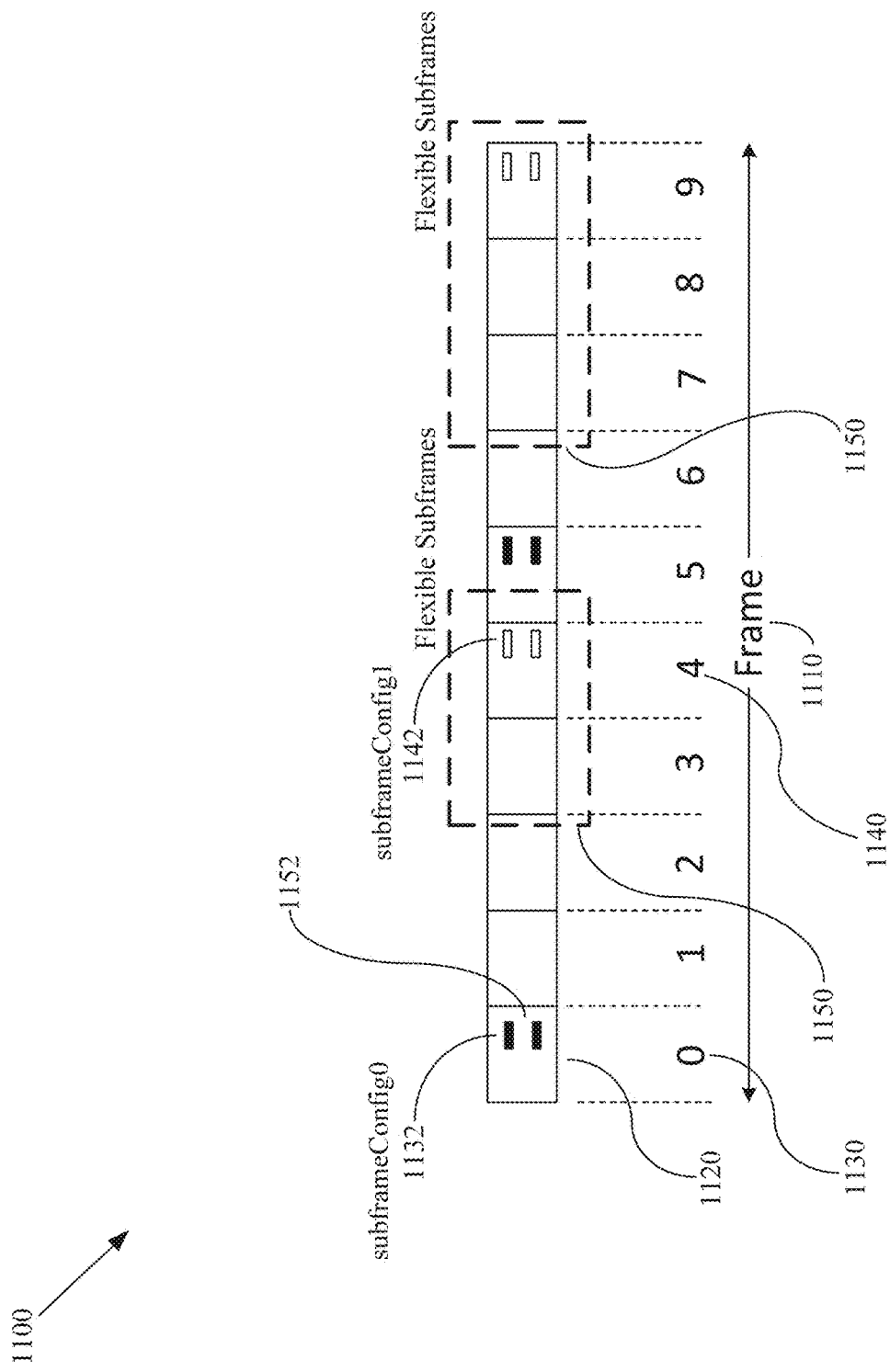
FIG. 11 illustrates an extended CSI-IM configuration according to an embodiment.

FIG. 11 illustrates an extended CSI-IM configuration 1100 according to an embodiment. In FIG. 11, a frame 1110 is shown including 10 subframes 1120. A configured CSI-IM resource within a subset of the subframes 1120 may be used to derive the interference measurement. In accordance to the LTE-A specification the CSI-IM is defined by two parameters, i.e., subframeConfig and resourceConfig that describe the set of downlink subframes and resource elements respectively, where CSI-IM is transmitted.

The extended CSI-IM configuration 1100, according to an embodiment, includes subframe 0 1130 that includes a parameter subframeConfig0 1132 for describing a set of downlink subframes for a first interference measurement. Subframe 4 1140 includes a parameter subframeConfig1 1142 for describing a set of downlink subframes for a second interference measurement.

According to 3GPP Release-11, a CSI-IM configuration is a subset of resource elements configured as zero-power CSI-RS. From a practical consideration, support of interference measurements for in systems with dynamic DL to UL configuration using a single CSI process is preferable. However with a single CSI process, one CSI-IM configuration may be supported by the UE. In this case, CSI-IM resource transmissions residing on different types of downlink subframes, e.g., flexible 1150 and non-flexible, may not be possible. This is due to CSI-IM periodicity of a multiple of 5 ms.

The extended CSI-IM configuration 1100 according to an embodiment provides an extended CSI-IM configuration that includes parameter subframeConfig1 1142. Independent interference measurements for flexible 1150 and non-flexible subframes may thus be achieved by using subframe sets.

Figure 12:
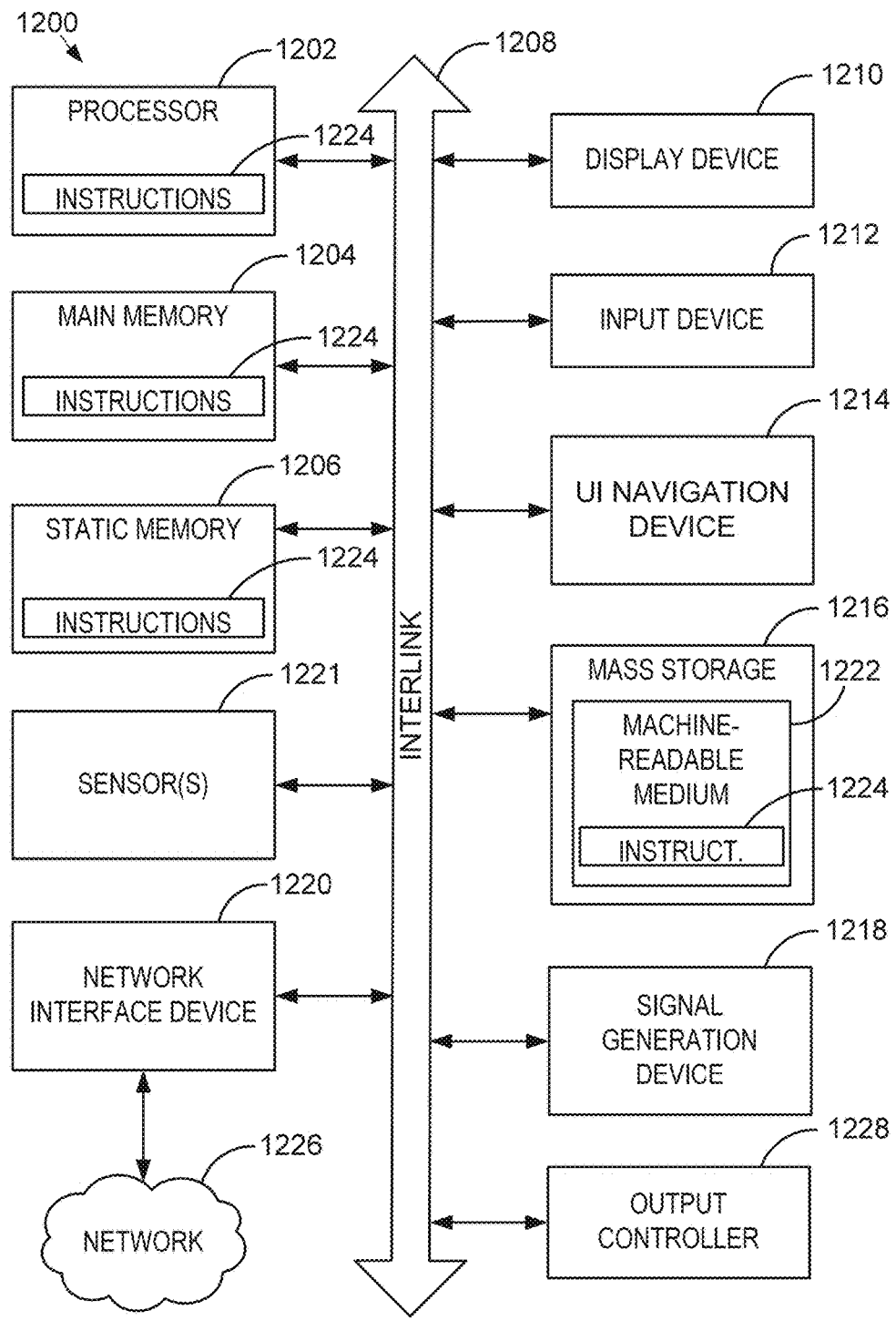
FIG. 12 illustrates a block diagram of an example machine for providing enhanced interference measurements with CSI feedback according to an embodiment.

FIG. 12 illustrates a block diagram of an example machine 1200 for providing enhanced interference measurements with CSI feedback according to an embodiment upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine and/or a client machine in server-client network environments. In an example, the machine 1200 may act as a peer machine in peer-to-peer (P2P) (or other distributed) network environment. The machine 1200 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1202 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1202 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, at least some of which may communicate with others via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR)) connection to communicate or control one or more peripheral devices (e.g., a printer, card reader, etc.).

The storage device 1216 may include at least one machine readable medium 1222 on which is stored one or more sets of data structures or instructions 1224 (e.g., software) embodying or utilized by any one or more of the techniques or functions described herein. The instructions 1224 may also reside, at least partially, additional machine readable memories such as main memory 1204, static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) that configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

Figure 13:
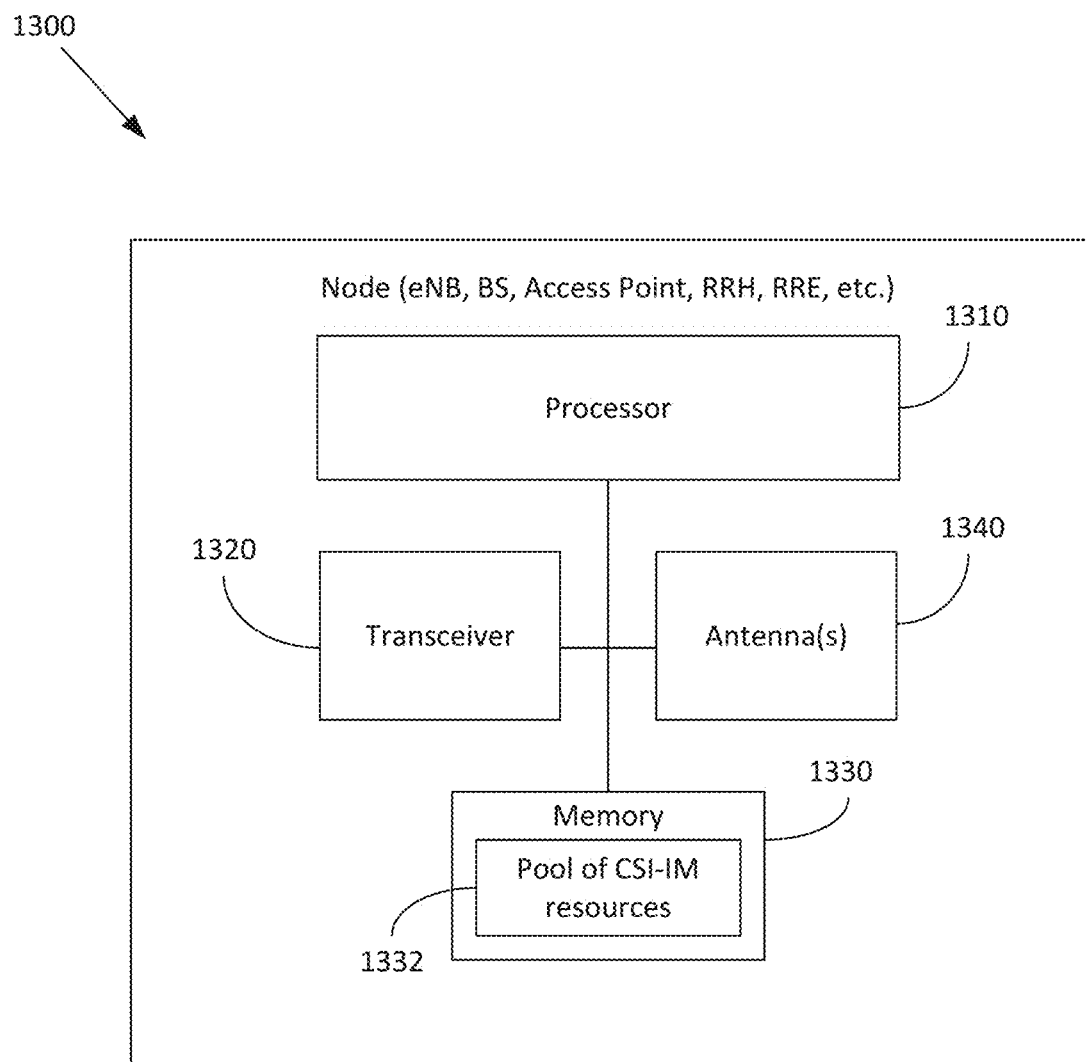
FIG. 13 illustrates a node according to an embodiment.

FIG. 13 illustrates a node 1300 according to an embodiment. In FIG. 13, a processor 1310 is coupled to a transceiver 1320 and memory 1330. Communications signals are radiated and intercepted via an antenna 1340. The transceiver 1320 processes signals for transmission or received signals. The memory 1330 may be used to store data including a pool of ZP CSI-RS interference measurement resources 1332.

The processor 1310 determines CSI-IM resources for use by a user equipment (UE) served by the node to perform interference measurements for CSI. The processor determines a hopping pattern for varying a position of the determined CSI-IM resources in subframes transmitted to the served UE. The determined CSI-IM resources and the determined CSI-IM resources hopping pattern are provided to the transceiver 1320 for transmission to nodes and to the UE. A zero-power (ZP) CSI-RS according to the determined CSI-IM resources and the determined CSI-IM resources hopping pattern are provided to the transceiver for transmission to the served UE. A received interference measurement from the served UE based on CSI-IM received by the served UE and the ZP CSI-RS provided to the served UE is processed by the processor 1310. Collisions between the CSI-IM transmitted by the transceiver 1320 and CSI-IM of the neighboring nodes are minimized by the determined CSI-IM resources hopping pattern. The processor 1310 is further arranged to generate pseudo-random numbers and to define a position value of the CSI-IM resources to cause the position of the CSI-IM resources in subframes to vary in the time domain using the pseudo-random numbers. The processor 1310 also selects a subframe periodicity and an offset for the subframes. The hopping pattern is defined by at least two CSI-RS parameters resourceConfig and the periodicity and offset are defined by at least two CSI-RS parameter subframeConfig. The processor 1310 may also determine a hopping pattern that is defined according to $$f_{ih}(n_s) = \begin{cases} 0 \\ \left(\sum_{i=0}^{7} c(8\lfloor n_s/2 \rfloor + i) \cdot 2^i\right) \bmod N_{CSI\text{-}IM} \end{cases}$$

if CSI-IM hopping is disabled
if CSI-IM hopping is enabled,
where $f_{ih}$ is a random value for selecting the CSI-IM from a CSI-IM resource pool, $P_{CSI\text{-}IM}$, $(n_s)$, where $n_s$ is a identifier of a slot or subframe, $N_{CSI\text{-}IM}$ is a number of CSI-IM resources in the configured CSI-IM resource pool and c(i) is a pseudo-random sequence.

Additional Notes & Examples

Example 1 may include subject matter (such as a method or means for performing acts) including determining, by a serving cell, CSI-IM resources for use by a served user equipment (UE) to perform interference measurements, transmitting the determined CSI-IM resources to the served UE using RRC signaling, transmitting, by the serving cell, a zero-power (ZP) CSI-RS according to the determined CSI-IM resources using RRC signaling to remove serving cell interference and receiving, by the serving cell, CSI feedback corresponding to interference measurements performed by the served UE using CSI-IM received by the served UE from the serving cell and the ZP CSI-RS transmitted to the served UE from the serving cell.

Example 2 may optionally include the subject matter of Example 1, further including generating by a serving cell, pseudo-random numbers and defining, by the serving cell, a position value of the CSI-IM resource to cause the position of the CSI-IM resources in subframes to vary in a time domain using the pseudo-random numbers.

Example 3 may optionally include the subject matter of any one or more of Examples 1-2, further comprising providing, by the serving cell, a plurality of CSI-IM resources in a subframe, wherein the determining, by the serving cell, the CSI-IM resources to provide in subframes further comprises selecting, by the serving cell, a subframe periodicity and an offset for the subframes.

Example 4 may optionally include the subject matter of any one or more of Examples 1-3, further comprising determining, by the serving cell, a hopping pattern for varying a position of the determined CSI-IM resources in subframes transmitted to a served UE using at least two CSI-RS resourceConfig messages, transmitting the determined CSI-IM resources hopping pattern to the served UE using RRC signaling, wherein the determining the hopping pattern comprises selecting a hopping pattern to minimize collisions between CSI-IM resources of different nodes and wherein the selecting a subframe periodicity and an offset for the subframes further comprises defining the periodicity and offset using at least two CSI-RS subframeConfig messages.

Example 5 may optionally include the subject matter of any one or more of Examples 1-4, wherein the determining, by the serving cell, the hopping pattern further comprises defining a pseudo-random sequence hopping function according to:

$$f_{ih}(n_s) = \begin{cases} 0 & \text{if } CSI\text{-}IM \text{ hopping is disabled} \\ \left(\sum_{i=0}^{7} c(8\lfloor n_s/2 \rfloor + i) \cdot 2^i\right) \bmod N_{CSI\text{-}IM} & \text{if } CSI\text{-}IM \text{ hopping is enabled} \end{cases},$$

where $f_{ih}$ is a random value for selecting the CSI-IM from a configured CSI-IM resource pool, PCSI-IM, (ns) is an identifier of a subframe, NCSI-IM is a number of CSI-IM resources in the configured CSI-IM resource pool and c(i) is a pseudo-random sequence generated from a length-31 Gold sequence.

Example 6 may optionally include the subject matter of any one or more of Examples 1-5, wherein the determining, by the serving cell, CSI-IM resources for use by a user equipment (UE) to perform interference measurements further includes determining a plurality of subframe configurations and a resource configuration residing on different types of subframes, a first subframe configuration and resource configuration residing on a first type of subframe and a second subframe configuration residing on a second type of subframe.

Example 7 may optionally include the subject matter of any one or more of Examples 1-6, wherein the determining, by the serving cell, CSI-IM resources for use by a user equipment (UE) to perform interference measurements further comprising determining a first subframe set comprising a first subframe configuration and a first resource configuration and determining a second subframe set comprising a second subframe configuration, wherein the first subframe set and the second subframe set are arranged to provide independent interference measurements for flexible and non-flexible subframes.

Example 8 may include subject matter (such as a method or means for performing acts) including receiving, at a user equipment (UE), CSI-IM resources from a serving cell for use by a UE to perform interference measurements on nodes including the serving cell, receiving a zero-power (ZP) CSI-RS from the serving cell to remove serving cell interference, making interference measurements based on the received CSI-IM resources and the ZP CSI-RS and providing channel state information feedback to the serving cell based on the interference measurements.

Example 9 may optionally include the subject matter of Example 8, wherein the receiving CSI-IM resources from a serving cell further comprises receiving CSI-IM resources that include at least two parameter sets comprising {resourceConfig0, subframeConfig0} and {subframeConfig1}.

Example 10 may optionally include the subject matter of any one or more of Examples 8-9, further including further comprising receiving a CSI-IM resources hopping pattern including receiving at least two CSI-RS resourceConfig message defining the hopping pattern and receiving at least two subframeConfig message defining subframe periodicity and offset.

Example 11 may optionally include the subject matter of any one or more of Examples 8-10, wherein the receiving the CSI-IM resources hopping pattern further comprises receiving a hopping pattern defined according to:

$$f_{ih}(n_s) = \begin{cases} 0 & \text{if } CSI\text{-}IM \text{ hopping is disabled} \\ \left(\sum_{i=0}^{7} c(8\lfloor n_s/2 \rfloor + i) \cdot 2^i\right) \bmod N_{CSI\text{-}IM} & \text{if } CSI\text{-}IM \text{ hopping is enabled} \end{cases},$$

where $f_{ih}$ is a random value for selecting the CSI-IM from a configured CSI-IM resource pool, PCSI-IM, (ns) is an identifier of a subframe, NCSI-IM is a number of CSI-IM resources in the configured CSI-IM resource pool and c(i) is a pseudo-random sequence generated from a length-31 Gold sequence.

Example 12 may optionally include the subject matter of any one or more of Examples 8-11, wherein the receiving, by the UE, CSI-IM resources and the ZP CSI-RS from the serving node in subframes further comprises receiving CSI-IM resources and the ZP CSI-RS according to a subframe periodicity and an offset for the subframes defined by the serving cell and provided in the CSI-IM resources received from the serving cell.

Example 13 may optionally include the subject matter of any one or more of Examples 8-12, wherein the receiving, at the user equipment (UE), CSI-IM resources from a serving cell for use by a UE to perform interference measurements on nodes including the serving cell further comprises receiving a plurality of subframe configurations and a resource configuration residing on different types of subframes, a first subframe configuration and a first resource configuration residing on a first type of subframe and a second subframe configuration residing on a second type of subframe.

Example 14 may optionally include the subject matter of any one or more of Examples 8-13, wherein the receiving, at the user equipment (UE), CSI-IM resources from a serving cell for use by a UE to perform interference measurements on nodes including the serving cell further comprises receiving a first subframe set comprising a first subframe configuration and a first resource configuration and receiving a second subframe set comprising a second subframe configuration, wherein the first subframe set and the second subframe set are arranged to provide independent interference measurements for flexible and non-flexible subframes.

Example 15 may optionally include the subject matter of any one or more of Examples 8-14, wherein the making interference measurements based on the received CSI-IM resources further comprises processing the first subframe set and the second subframe set and performing interference measurements based on the processed first subframe set and second subframe set.

Example 16 may optionally include the subject matter of any one or more of Examples 8-15, wherein the receiving, at the user equipment (UE), CSI-IM resources from a serving cell for use by a UE to perform interference measurements on nodes including the serving cell further comprises receiving at least two parameter sets, the at least two parameter sets residing on different types of subframes, wherein a first subframe configuration and resource configuration reside on a first type of subframe and a second subframe configuration and resource configuration reside on a second type of subframe, wherein the making interference measurements based on the received CSI-IM resources further comprises performing interference measurements based on the processed at least two parameter sets residing on different types of subframes.

Example 17 may optionally include the subject matter of any one or more of Examples 8-16, further comprising processing a first of the at least two parameter sets comprising a first subframe configuration and resource configuration and a second of the at least two parameter sets comprising a second subframe configuration and resource configuration, wherein the making interference measurements based on the received CSI-IM resources further comprises providing independent interference measurements for flexible and non-flexible subframes based on the first subframe set and the second subframe set.

Example 18 includes subject matter (such as a device, apparatus, client or system) for a serving node, including memory for storing data thereon, a processor, coupled to the memory, for processing signals associated with communications including data from the memory, a transceiver, coupled to the processor, arranged to transmit and receive signals associated with communications and at least one antenna for radiating signals for transmission and intercepts signals for reception, wherein the processor is further arranged to determine CSI-IM resources for use by a served user equipment (UE) served by the serving cell to perform interference measurements, provide the determined CSI-IM resources to the transceiver for transmission to the served UE, provide, to the transceiver for transmission to the served UE, a zero-power (ZP) CSI-RS according to the determined CSI-IM resources to remove serving cell interference and process a received interference measurement from the served UE based on CSI-IM received by the served UE and the ZP CSI-RS provided to the served UE from the serving cell.

Example 19 may optionally include the subject matter of Example 16-18, wherein the processor is further arranged to generating pseudo-random numbers and to define a position value of the CSI-IM resources to cause the position of the CSI-IM resources in subframes to vary in a time domain using the pseudo-random numbers.

Example 20 may optionally include the subject matter of any one or more of Examples 18-19, wherein the processor further selecting a subframe periodicity and an offset for the subframes, wherein the processor is further arranged to determine a hopping pattern for varying a position of the determined CSI-IM resources in subframes transmitted to a served UE and to provide the determined CSI-IM resources and the determined CSI-IM resources hopping pattern to the transceiver for transmission to the served UE using the selected periodicity and offset, wherein collisions between the CSI-IM transmitted by the transceiver and CSI-IM of neighboring nodes are minimized by the determined hopping pattern.

Example 21 may optionally include the subject matter of any one or more of Examples 18-20 wherein the processor is further arranged to determine the hopping pattern according to:

$$f_{ih}(n_s) = \begin{cases} 0 & \text{if } CSI\text{-}IM \text{ hopping is disabled} \\ \left(\sum_{i=0}^{7} c(8\lfloor n_s/2 \rfloor + i) \cdot 2^i\right) \bmod N_{CSI\text{-}IM} & \text{if } CSI\text{-}IM \text{ hopping is enabled} \end{cases},$$

where $f_{ih}$ is a random value for selecting the CSI-IM from a configured CSI-IM resource pool, PCSI-IM, (ns) is an identifier of a subframe, NCSI-IM is a number of CSI-IM resources in the configured CSI-IM resource pool and c(i) is a pseudo-random sequence generated from a length-31 Gold sequence.

Example 22 may optionally include the subject matter of any one or more of Examples 18-21, wherein the processor is further arranged to determine CSI-IM resources by determining at least two parameter sets comprising {resourceConfig0, subframeConfig0} and {subframeConfig1}, the two parameter sets residing on different types of subframes, a first subframe configuration and a first resource configuration residing on a first type of subframe and a second subframe configuration residing on a second type of subframe.

Example 23 may optionally include the subject matter of any one or more of Examples 18-22, wherein the processor is further arranged to provide independent interference measurements for flexible and non-flexible subframes based on the at least two parameter sets residing on different types of subframes.

Example 24 includes subject matter (such as a device, apparatus, client or system) for a user equipment, including a processor for processing signals associated with communications, a transceiver, coupled to the processor, arranged to transmit and receive signals associated with communications and wherein the processor is further arranged to receive, from the transceiver, CSI-IM resources from a serving cell using radio resource control signaling, process the received CSI-IM resources to perform interference measurements on nodes including serving cell, process a zero-power (ZP) CSI-RS received at the transceiver from the serving node to remove serving cell interference, perform interference measurements associated with nodes including serving cell based on the CSI-IM resource received at the transceiver from the serving cell and provide channel state information feedback to the serving cell based on the interference measurements.

Example 25 may optionally include the subject matter of Example 24, wherein the processor is further arranged to receive CSI-IM and the ZP CSI-RS from the serving cell in subframes according to a subframe periodicity and an offset for the subframes defined by the serving cell and provided in the CSI-IM resources received from the serving cell.

Example 26 may optionally include the subject matter of any one or more of Examples 24-25, wherein the processor is further arranged to process a CSI-IM resources hopping pattern received at the transceiver from a serving cell for varying a position of the CSI-IM resources in subframes and to receive CSI-IM and the ZP CSI-RS from the serving cell in positions in subframes according to the received CSI-IM resources hopping pattern.

Example 27 may optionally include the subject matter of any one or more of Examples 24-26, wherein the hopping pattern is defined according to:

$$f_{ih}(n_s) = \begin{cases} 0 & \text{if } \mathit{CSI\text{-}IM} \text{ hopping is disabled} \\ \left(\sum_{i=0}^{7} c(8\lfloor n_s/2 \rfloor + i) \cdot 2^i\right) \bmod N_{CSI\text{-}IM} & \text{if } \mathit{CSI\text{-}IM} \text{ hopping is enabled} \end{cases}$$

where $f_{ih}$ is a random value for selecting the CSI-IM from a configured CSI-IM resource pool, PCSI-IM, (ns) is an identifier of a subframe, NCSI-IM is a number of CSI-IM resources in the configured CSI-IM resource pool and c(i) is a pseudo-random sequence generated from a length-31 Gold sequence.

Example 28 may optionally include the subject matter of any one or more of Examples 24-27, wherein the receiving CSI-IM resources from a serving cell further comprises receiving CSI-IM resources that include at least two parameter sets comprising {resourceConfig0, subframeConfig0} and {subframeConfig1} and wherein the processor is further arranged to process the at least two parameter sets, the processor further arranged to perform interference measurements associated with the nodes including serving cell based on the processed at least two parameter sets.

Example 29 may optionally include the subject matter of any one or more of Examples 24-28, wherein the at least two parameter sets reside on different types of subframes, a first subframe configuration and resource configuration residing on a first type of subframe and a second subframe configuration residing on a second type of subframe, the processor further arranged to perform interference measurements based on the processed at least two parameter sets residing on different types of subframes.

Example 30 may optionally include the subject matter of any one or more of Examples 24-29, wherein the at least two parameter sets are arranged to provide independent interference measurements for flexible and non-flexible subframes.

Example 31 may include subject matter (such as means for performing acts or machine readable medium including instructions that, when executed by the machine, cause the machine to perform acts) including determining, by a serving cell, CSI-IM resources for use by a served user equipment (UE) to perform interference measurements, transmitting the determined CSI-IM resources to the served UE using RRC signaling, transmitting, by the serving cell, a zero-power (ZP) CSI-RS according to the determined CSI-IM resources using RRC signaling to remove serving cell interference and receiving, by the serving cell, CSI feedback corresponding to interference measurements performed by the served UE using CSI-IM received by the served UE from the serving cell and the ZP CSI-RS transmitted to the served UE from the serving cell.

Example 32 may optionally include the subject matter of Example 31, further including generating by a serving cell, pseudo-random numbers and defining, by the serving cell, a position value of the CSI-IM resource to cause the position of the CSI-IM resources in subframes to vary in a time domain using the pseudo-random numbers.

Example 33 may optionally include the subject matter of any one or more of Examples 31-32, further comprising providing, by the serving cell, a plurality of CSI-IM resources in a subframe, wherein the determining, by the serving cell, the CSI-IM resources to provide in subframes further comprises selecting, by the serving cell, a subframe periodicity and an offset for the subframes.

Example 34 may optionally include the subject matter of any one or more of Examples 31-33, further comprising determining, by the serving cell, a hopping pattern for varying a position of the determined CSI-IM resources in subframes transmitted to a served UE using at least two CSI-RS resourceConfig messages, transmitting the determined CSI-IM resources hopping pattern to the served UE using RRC signaling, wherein the determining the hopping pattern comprises selecting a hopping pattern to minimize collisions between CSI-IM resources of different nodes and wherein the selecting a subframe periodicity and an offset for the subframes further comprises defining the periodicity and offset using at least two CSI-RS subframeConfig messages.

Example 35 may optionally include the subject matter of any one or more of Examples 31-34, wherein the determining, by the serving cell, the hopping pattern further comprises defining a pseudo-random sequence hopping function according to:

$$f_{ih}(n_s) = \begin{cases} 0 & \text{if } CSI\text{-}IM \text{ hopping is disabled} \\ \left(\sum_{i=0}^{7} c(8\lfloor n_s/2 \rfloor + i) \cdot 2^i\right) \bmod N_{CSI\text{-}IM} & \text{if } CSI\text{-}IM \text{ hopping is enabled} \end{cases},$$

where $f_{ih}$ is a random value for selecting the CSI-IM from a configured CSI-IM resource pool, PCSI-IM, (ns) is an identifier of a subframe, NCSI-IM is a number of CSI-IM resources in the configured CSI-IM resource pool and c(i) is a pseudo-random sequence generated from a length-31 Gold sequence.

Example 36 may optionally include the subject matter of any one or more of Examples 31-35, wherein the determining, by the serving cell, CSI-IM resources for use by a user equipment (UE) to perform interference measurements further includes determining a plurality of subframe configurations and a resource configuration residing on different types of subframes, a first subframe configuration and resource configuration residing on a first type of subframe and a second subframe configuration residing on a second type of subframe.

Example 37 may optionally include the subject matter of any one or more of Examples 31-36, wherein the determining, by the serving cell, CSI-IM resources for use by a user equipment (UE) to perform interference measurements further comprising determining a first subframe set comprising a first subframe configuration and a first resource configuration and determining a second subframe set comprising a second subframe configuration, wherein the first subframe set and the second subframe set are arranged to provide independent interference measurements for flexible and non-flexible subframes.

Example 38 may include subject matter (such as means for performing acts or machine readable medium including instructions that, when executed by the machine, cause the machine to perform acts) including receiving, at a user equipment (UE), CSI-IM resources from a serving cell for use by a UE to perform interference measurements on nodes including the serving cell, receiving a zero-power (ZP) CSI-RS from the serving cell to remove serving cell interference, making interference measurements based on the received CSI-IM resources and the ZP CSI-RS and providing channel state information feedback to the serving cell based on the interference measurements.

Example 39 may optionally include the subject matter of Example 38, wherein the receiving CSI-IM resources from a serving cell further comprises receiving CSI-IM resources that include at least two parameter sets comprising {resourceConfig0, subframeConfig0} and {subframeConfig1}.

Example 40 may optionally include the subject matter of any one or more of Examples 38-39, further comprising receiving a CSI-IM resources hopping pattern including receiving at least two CSI-RS resourceConfig message defining the hopping pattern and receiving at least two subframeConfig message defining subframe periodicity and offset.

Example 41 may optionally include the subject matter of any one or more of Examples 38-40, wherein the receiving the CSI-IM resources hopping pattern further comprises receiving a hopping pattern defined according to:

$$f_{ih}(n_s) = \begin{cases} 0 & \text{if } CSI\text{-}IM \text{ hopping is disabled} \\ \left(\sum_{i=0}^{7} c(8\lfloor n_s/2 \rfloor + i) \cdot 2^i\right) \bmod N_{CSI\text{-}IM} & \text{if } CSI\text{-}IM \text{ hopping is enabled} \end{cases},$$

where $f_{ih}$ is a random value for selecting the CSI-IM from a configured CSI-IM resource pool, PCSI-IM, (ns) is an identifier of a subframe, NCSI-IM is a number of CSI-IM resources in the configured CSI-IM resource pool and c(i) is a pseudo-random sequence generated from a length-31 Gold sequence.

Example 42 may optionally include the subject matter of any one or more of Examples 38-41, wherein the receiving, by the UE, CSI-IM resources and the ZP CSI-RS from the serving node in subframes further comprises receiving CSI-IM resources and the ZP CSI-RS according to a subframe periodicity and an offset for the subframes defined by the serving cell and provided in the CSI-IM resources received from the serving cell.

Example 43 may optionally include the subject matter of any one or more of Examples 38-42, wherein the receiving, at the user equipment (UE), CSI-IM resources from a serving cell for use by a UE to perform interference measurements on nodes including the serving cell further comprises receiving a plurality of subframe configurations and a resource configuration residing on different types of subframes, a first subframe configuration and a first resource configuration residing on a first type of subframe and a second subframe configuration residing on a second type of subframe.

Example 44 may optionally include the subject matter of any one or more of Examples 38-43, wherein the receiving, at the user equipment (UE), CSI-IM resources from a serving cell for use by a UE to perform interference measurements on nodes including the serving cell further comprises receiving a first subframe set comprising a first subframe configuration and a first resource configuration and receiving a second subframe set comprising a second subframe configuration, wherein the first subframe set and the second subframe set are arranged to provide independent interference measurements for flexible and non-flexible subframes.

Example 45 may optionally include the subject matter of any one or more of Examples 38-44, wherein the making interference measurements based on the received CSI-IM resources further comprises processing the first subframe set and the second subframe set and performing interference measurements based on the processed first subframe set and second subframe set.

Example 46 may optionally include the subject matter of any one or more of Examples 38-45, wherein the receiving, at the user equipment (UE), CSI-IM resources from a serving cell for use by a UE to perform interference measurements on nodes including the serving cell further comprises receiving at least two parameter sets, the at least two parameter sets residing on different types of subframes, wherein a first subframe configuration and resource configuration reside on a first type of subframe and a second subframe configuration and resource configuration reside on a second type of subframe, wherein the making interference measurements based on the received CSI-IM resources further comprises performing interference measurements based on the processed at least two parameter sets residing on different types of subframes.

Example 47 may optionally include the subject matter of any one or more of Examples 38-46, further comprising processing a first of the at least two parameter sets comprising a first subframe configuration and resource configuration and a second of the at least two parameter sets comprising a second subframe configuration and resource configuration, wherein the making interference measurements based on the received CSI-IM resources further comprises providing independent interference measurements for flexible and non-flexible subframes based on the first subframe set and the second subframe set.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A User Equipment (UE) comprising:
   a processor configured to process signals associated with communications;
   a transceiver configured to transmit and receive signals associated with the communications;
   wherein the processor is further configured to:
   receive CSI-IM resources from a serving cell from the transceiver;
   process the received CSI-IM resources to perform interference measurements on cells including the said serving cell;
   process a zero-power (ZP) CSI-RS according to the CSI-IM resources received at the transceiver from the said serving cell;
   perform the interference measurements associated with the cells including the said serving cell based on the CSI-IM resources and ZP CSI-RS received at the transceiver from the said serving cell; and
   provide channel state information feedback to the said serving cell based on the interference measurements, wherein the processor is further configured to process a CSI-IM resources hopping pattern received at the transceiver from the said serving cell for varying a position of the CSI-IM resources in subframes and to receive CSI-IM and the ZP CSI-RS from the said serving cell in positions in subframes according to the received CSI-IM resources hopping pattern.

2. The UE of claim 1, wherein the processor is further configured to receive CSI-IM and the ZP CSI-RS from the said serving cell in subframes according to a subframe periodicity and an offset for the subframes defined by the said serving cell and provided in the CSI-IM resources received from the said serving cell.

3. The UE of claim 1, wherein the hopping pattern is defined according to:

$$f_{ih}(n_S) = \begin{cases} 0 \\ \left(\sum_{i=0}^{7} c(8\lfloor n_S/2 \rfloor + i) \cdot 2^i \right) \bmod N_{CSI-IM} \end{cases}$$

if $CSI$-$IM$ hopping is disabled if $CSI$-$IM$ hopping is enabled, mod $N_{CSI-IM}$
   is CSI-IM hopping is disabled
   is CSI-IM hopping is enabled,
      where $f_{ih}$ is a random value for selecting the CSI-IM from a configured CSI-IM resource pool, $P_{CSI-IM}$, ($n_s$) is an identifier of a subframe, $N_{CSI-IM}$ is a number of CSI-IM resources in the configured CSI-IM resource pool and c(i) is a pseudo-random sequence generated from a length-31 Gold sequence.

4. The UE of claim 1, wherein the receiving CSI-IM resources from a serving cell further comprises receiving CSI-IM resources that include at least two parameter sets comprising {resourceConfig0, subframeConfig0} and {subframeConfig1} and wherein the processor is further configured to process the at least two parameter sets, the processor further configured to perform interference measurements associated with cells including the said serving cell based on the processed at least two parameter sets.

5. The UE of claim 4, wherein the at least two parameter sets reside on different types of subframes, a first subframe configuration and resource configuration residing on a first type of subframe and a second subframe configuration residing on a second type of subframe, the processor further configured to perform interference measurements based on the processed at least two parameter sets residing on different types of subframes.

6. The UE of claim 4, wherein the at least two parameter sets are configured to provide independent interference measurements for flexible and non-flexible subframes.

7. At least one non-transitory machine readable medium comprising instructions that, when executed by the machine, cause the machine to perform operations comprising:
receiving CSI-IM resources from a serving cell;
processing the received CSI-IM resources to perform interference measurements on cells including the serving cell;
processing a zero-power (ZP) CSI-RS according to the CSI-IM resources received from the serving cell;
performing the interference measurements associated with the cells including the serving cell based on the CSI-IM resources and ZP CSI-RS received from the serving cell;
providing channel state information feedback to the serving cell based on the interference measurements;
processing a CSI-IM resources hopping pattern received from the serving cell for varying a position of the CSI-IM resources in subframes; and
receiving CSI-IM and the ZP CSI-RS from the serving cell in positions in subframes according to the received CSI-IM resources hopping pattern.

8. The non-transitory computer-readable medium of claim 7, wherein the instructions further configure cause the machine to receive CSI-IM and the ZP CSI-RS from the serving cell in subframes according to a subframe periodicity and an offset for the subframes defined by the serving cell and provided in the CSI-IM resources received from the serving cell.

9. The non-transitory computer-readable medium of claim 7, wherein the hopping pattern is defined according to:

$$f_{ih}(n_S) = \begin{cases} 0 \\ \left(\sum_{i=0}^{7} c(8\lfloor n_S/2 \rfloor + i) \cdot 2^i\right) \bmod N_{CSI-IM} \end{cases}$$

if CSI-IM hopping is disabled if CSI-IM hopping is enabled, mod $N_{CSI-IM}$
is CSI-IM hopping is disabled
is CSI-IM hopping is enabled,
where $f_{ih}$ is a random value for selecting the CSI-IM from a configured CSI-IM resource pool, $P_{CSI-IM}$, ($n_s$) is an identifier of a subframe, $N_{CSI-IM}$ is a number of CSI-IM resources in the configured CSI-IM resource pool and c(i) is a pseudo-random sequence generated from a length-31 Gold sequence.

10. The non-transitory computer-readable medium of claim 7, wherein the instructions further cause the machine to:
receive CSI-IM resources that include at least two parameter sets comprising {resourceConfig0, subframeConfig0} and {subframeConfig1};
process the at least two parameter sets; and
perform interference measurements associated with cells including the serving cell based on the processed at least two parameter sets.

11. The non-transitory computer-readable medium of claim 10, wherein the at least two parameter sets reside on different types of subframes, a first subframe configuration and resource configuration residing on a first type of subframe and a second subframe configuration residing on a second type of subframe, and wherein the instructions further cause the machine to perform interference measurements based on the processed at least two parameter sets residing on different types of subframes.

12. The non-transitory computer-readable medium of claim 10, wherein the at least two parameter sets are configured to provide independent interference measurements for flexible and non-flexible subframes.

13. A method to be implemented by a User Equipment (UE), the method comprising:
receiving CSI-IM resources from a serving cell;
processing the received CSI-IM resources to perform interference measurements on cells including the serving cell;
processing a zero-power (ZP) CSI-RS according to the CSI-IM resources received from the serving cell;
performing the interference measurements associated with the cells including the serving cell based on the CSI-IM resources and ZP CSI-RS received from the serving cell;
providing channel state information feedback to the serving cell based on the interference measurements;
processing a CSI-IM resources hopping pattern received from the serving cell for varying a position of the CSI-IM resources in subframes; and
receiving CSI-IM and the ZP CSI-RS from the serving cell in positions in subframes according to the received CSI-IM resources hopping pattern.

14. The method of claim 13, further comprising:
receiving CSI-IM and the ZP CSI-RS from the serving cell in subframes according to a subframe periodicity and an offset for the subframes defined by the serving cell and provided in the CSI-IM resources received from the serving cell.

15. The method of claim 13, wherein the hopping pattern is defined according to:

$$f_{ih}(n_S) = \begin{cases} 0 \\ \left(\sum_{i=0}^{7} c(8\lfloor n_S/2 \rfloor + i) \cdot 2^i\right) \bmod N_{CSI-IM} \end{cases}$$

if CSI-IM hopping is disabled if CSI-IM hopping is enabled, mod $N_{CSI\text{-}IM}$
    is CSI-IM hopping is disabled
    is CSI-IM hopping is enabled,
        where $f_{ih}$ is a random value for selecting the CSI-IM from a configured CSI-IM resource pool, $P_{CSI\text{-}IM}$, ($n_s$) is an identifier of a subframe, $N_{CSI\text{-}IM}$ is a number of CSI-IM resources in the configured CSI-IM resource pool and c(i) is a pseudo-random sequence generated from a length-31 Gold sequence.

16. The method of claim 13, wherein the receiving CSI-IM resources from a serving cell further comprises receiving CSI-IM resources that include at least two parameter sets comprising {resourceConfig0, subframeConfig0} and {subframeConfig1} and wherein the method further comprises processing the at least two parameter sets and performing interference measurements associated with cells including the serving cell based on the processed at least two parameter sets.

17. The method of claim 16, wherein the at least two parameter sets reside on different types of subframes, a first subframe configuration and resource configuration residing on a first type of subframe and a second subframe configuration residing on a second type of subframe, the processor further configured to perform interference measurements based on the processed at least two parameter sets residing on different types of subframes.

18. The method of claim 16, wherein the at least two parameter sets are configured to provide independent interference measurements for flexible and non-flexible subframes.

19. A serving cell, comprising:
    memory for storing data thereon;
    a processor, coupled to the memory, for processing signals associated with communications including data from the memory;
    a transceiver, coupled to the processor, arranged to transmit and receive signals associated with communications; and
    at least one antenna for radiating signals for transmission and intercepts signals for reception;
    wherein the processor is further arranged to:
    determine CSI-IM resources for use by a served user equipment (UE) served by the serving cell to perform interference measurements;
    provide the determined CSI-IM resources to the transceiver for transmission to the served UE;
    provide, to the transceiver for transmission to the served UE, a zero-power (ZP) CSI-RS according to the determined CSI-IM resources to remove serving cell interference; and
    process a received interference measurement from the served UE based on CSI-IM received by the served UE and the ZP CSI-RS provided to the served UE from the serving cell.

20. The serving cell of claim 19, wherein the processor is further arranged to generating pseudo-random numbers and to define a position value of the CSI-IM resources to cause the position of the CSI-IM resources in subframes to vary in a time domain using the pseudo-random numbers.

21. The serving cell of claim 19, wherein the processor further selecting a subframe periodicity and an offset for the subframes, wherein the processor is further arranged to determine a hopping pattern for varying a position of the determined CSI-IM resources in subframes transmitted to a served UE and to provide the determined CSI-IM resources and the determined CSI-IM resources hopping pattern to the transceiver for transmission to the served UE using the selected periodicity and offset, wherein collisions between the CSI-IM transmitted by the transceiver and CSI-IM of neighboring nodes are minimized by the determined hopping pattern.

22. The serving cell of claim 21, wherein the processor is further arranged to determine the hopping pattern according to:

$$f_{ih}(n_S) = \begin{cases} 0 \\ \left( \sum_{i=0}^{7} c(8\lfloor n_S/2 \rfloor + i) \cdot 2^i \right) \bmod N_{CSI\text{-}IM} \end{cases}$$

if CSI-IM hopping is disabled if CSI-IM hopping is enabled, mod $N_{CSI\text{-}IM}$
    is CSI-IM hopping is disabled
    is CSI-IM hopping is enabled, where $f_{ih}$ is a random value for selecting the CSI-IM from a configured CSI-IM resource pool, $P_{CSI\text{-}IM}$, ($n_s$) is an identifier of a subframe, $N_{CSI\text{-}IM}$ is a number of CSI-IM resources in the configured CSI-IM resource pool and c(i) is a pseudo-random sequence generated from a length-31 Gold sequence.

23. The serving cell of claim 19, wherein the processor is further arranged to determine CSI-IM resources by determining at least two parameter sets comprising {resourceConfig0, subframeConfig0} and {subframeConfig1}, the two parameter sets residing on different types of subframes, a first subframe configuration and a first resource configuration residing on a first type of subframe and a second subframe configuration residing on a second type of subframe.

24. The serving cell of claim 23, wherein the processor is further arranged to provide independent interference measurements for flexible and non-flexible subframes.

* * * * *

UNITED STATES PATENT AND TRADEMARK OFFICE
CERTIFICATE OF CORRECTION

PATENT NO. : 10,098,032 B2  
APPLICATION NO. : 15/679778  
DATED : October 9, 2018  
INVENTOR(S) : Davydov et al.

Page 1 of 1

It is certified that error appears in the above-identified patent and that said Letters Patent is hereby corrected as shown below:

In the Claims

In Column 20, Lines 63-65, in Claim 3, before "where", delete "mod $N_{CSI-IM}$ is CSI-IM hopping is disabled is CSI-IM hopping is enabled,"

In Column 21, Lines 63-65, in Claim 9, before "where", delete "mod $N_{CSI-IM}$ is CSI-IM hopping is disabled is CSI-IM hopping is enabled,"

In Column 23, Lines 1-3, in Claim 15, before "where", delete "mod $N_{CSI-IM}$ is CSI-IM hopping is disabled is CSI-IM hopping is enabled,"

In Column 24, Lines 32-34, in Claim 22, before "where", delete "mod $N_{CSI-IM}$ is CSI-IM hopping is disabled is CSI-IM hopping is enabled,"

Signed and Sealed this  
Twenty-first Day of April, 2020

Andrei Iancu  
*Director of the United States Patent and Trademark Office*